United States Patent
Kumazaki et al.

(10) Patent No.: US 12,438,333 B2
(45) Date of Patent: Oct. 7, 2025

(54) LINE NARROWING GAS LASER DEVICE, WAVELENGTH CONTROL METHOD, AND ELECTRONIC DEVICE MANUFACTURING METHOD

(71) Applicant: Gigaphoton Inc., Tochigi (JP)

(72) Inventors: Takahito Kumazaki, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 592 days.

(21) Appl. No.: 18/047,596

(22) Filed: Oct. 18, 2022

(65) Prior Publication Data
US 2023/0064314 A1    Mar. 2, 2023

Related U.S. Application Data

(63) Continuation of application No. PCT/JP2020/019883, filed on May 20, 2020.

(51) Int. Cl.
*H01S 3/1055*    (2006.01)
*H01S 3/094*    (2006.01)
(Continued)

(52) U.S. Cl.
CPC ...... *H01S 3/094096* (2013.01); *H01S 3/1024* (2013.01); *H01S 3/104* (2013.01)

(58) Field of Classification Search
CPC .. H01S 3/104; H01S 3/094096; H01S 3/1024; H01S 3/106; H01S 3/08004;
(Continued)

(56) References Cited

U.S. PATENT DOCUMENTS 6,393,037 B1 * 5/2002 Basting ............... H01S 3/08004
372/100
2002/0141464 A1 * 10/2002 Bushida .................. H01S 3/139
372/32
(Continued)

FOREIGN PATENT DOCUMENTS

CN    101405920 A    4/2009
JP    H07-058393 A    3/1995
(Continued)

OTHER PUBLICATIONS

International Search Report issued in PCT/JP2020/019883; mailed Jul. 21, 2020.
(Continued)

*Primary Examiner* — Xinning (Tom) Niu
(74) *Attorney, Agent, or Firm* — Studebaker Brackett PLLC

(57) ABSTRACT

A line narrowing gas laser device includes an actuator changing a center wavelength of pulse laser light, and a processor controlling the actuator. The processor reads parameters including a number of irradiation pulses of pulse laser light to be radiated to one location of an irradiation receiving object, a shortest wavelength, and a longest wavelength; sets a first pattern with which the center wavelength is changed to approach the longest wavelength from the shortest wavelength and a second pattern with which the center wavelength is changed to approach the shortest wavelength from the longest wavelength such that at least one of the first pattern and the second pattern when the number of irradiation pulses is an even number is different from corresponding one when the number of irradiation pulses is an odd number; and controls the actuator so that the first pattern and the second pattern are alternately performed.

20 Claims, 19 Drawing Sheets

(51) Int. Cl.
*H01S 3/102* (2006.01)
*H01S 3/104* (2006.01)

(58) Field of Classification Search
CPC .... H01S 3/10069; H01S 3/225; H01S 3/1055; H01S 3/08009; G03F 7/20
See application file for complete search history.

(56) References Cited

U.S. PATENT DOCUMENTS

| | | |
|---|---|---|
| 2002/0167975 A1 | 11/2002 | Spangler et al. |
| 2005/0083983 A1 | 4/2005 | Sandstrom et al. |
| 2005/0286598 A1 | 12/2005 | Sandstrom et al. |
| 2006/0114958 A1* | 6/2006 | Trintchouk ............ B82Y 10/00 372/55 |
| 2009/0002666 A1 | 1/2009 | Tsuchiya |
| 2009/0147231 A1 | 6/2009 | Sukegawa |
| 2010/0232458 A1 | 9/2010 | Kim et al. |
| 2013/0170508 A1 | 7/2013 | Suzuki et al. |
| 2014/0063488 A1* | 3/2014 | Adler ................. G01B 9/02067 356/51 |
| 2015/0380893 A1 | 12/2015 | Matsunaga et al. |

FOREIGN PATENT DOCUMENTS

| | | |
|---|---|---|
| JP | 2004-537176 A | 12/2004 |
| JP | 2007-511074 A | 4/2007 |
| JP | 2008-504684 A | 2/2008 |
| JP | 2009-010231 A | 1/2009 |
| JP | 2009-141154 A | 6/2009 |
| JP | 2013-033932 A | 2/2013 |
| TW | 200937134 A | 9/2009 |
| WO | 2019079010 A1 | 4/2019 |

OTHER PUBLICATIONS

International Preliminary Report on Patentability and Written Opinion issued in PCT/JP2020/019883; issued Nov. 17, 2022.

An Office Action mailed by China National Intellectual Property Administration on May 23, 2025, which corresponds to Chinese Patent Application No. 2020800993873.4 and is related to U.S. Appl. No. 18/047,596; with English language translation.

* cited by examiner

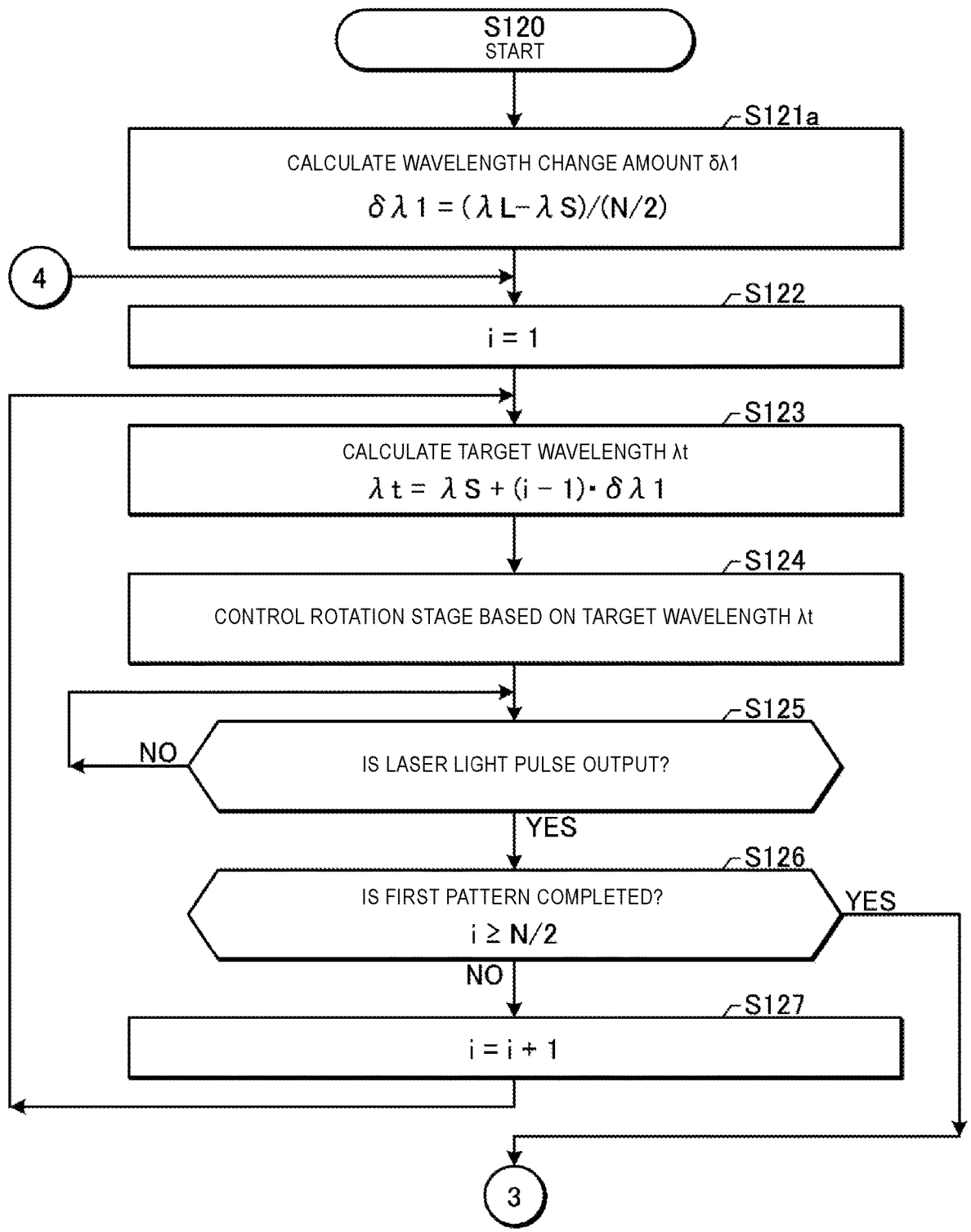

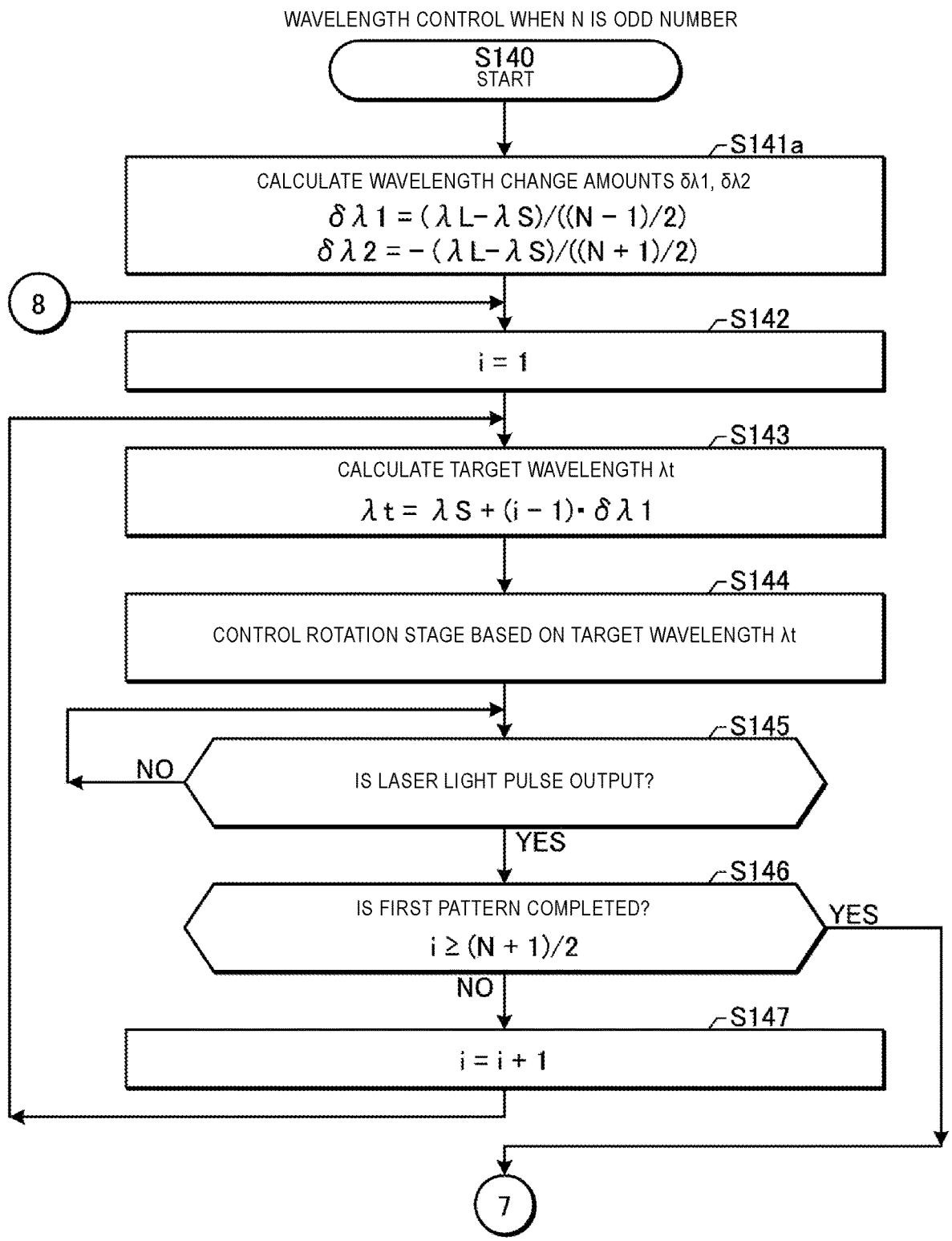

LINE NARROWING GAS LASER DEVICE, WAVELENGTH CONTROL METHOD, AND ELECTRONIC DEVICE MANUFACTURING METHOD

The present application claims the benefit of International Application No. PCT/JP2020/019883, filed on May 20, 2020 the entire contents of which are hereby incorporated by reference.

BACKGROUND

1. Technical Field

The present disclosure relates to a line narrowing gas laser device, a wavelength control method, and an electronic device manufacturing method.

2. Related Art

Improvement in resolution of a semiconductor exposure apparatus has been desired for miniaturization and high integration of semiconductor integrated circuits. Hereinafter, a semiconductor exposure apparatus is simply referred to as an "exposure apparatus." For this purpose, an exposure light source that outputs light having a shorter wavelength has been developed. As the exposure light source, a gas laser device is used in place of a conventional mercury lamp. As a gas laser device for exposure, a KrF excimer laser device that outputs ultraviolet light having a wavelength of 248 nm and an ArF excimer laser device that outputs ultraviolet light having a wavelength of 193 nm are currently used.

As current exposure technology, immersion exposure is practically used in which a gap between a projection lens of an exposure apparatus and a wafer is filled with a liquid and a refractive index of the gap is changed to reduce an apparent wavelength of light from an exposure light source. When the immersion exposure is performed using the ArF excimer laser device as the exposure light source, the wafer is irradiated with ultraviolet light having a wavelength of 134 nm in water. This technology is referred to as ArF immersion exposure. The ArF immersion exposure is also referred to as ArF immersion lithography.

Since the KrF excimer laser device and the ArF excimer laser device have a large spectral line width of about 350 to 400 pm in natural oscillation, chromatic aberration of laser light (ultraviolet light), which is reduced and projected on a wafer by a projection lens of an exposure apparatus, occurs to deteriorate resolution. Then, a spectral line width of laser light output from the gas laser device needs to be narrowed to the extent that the chromatic aberration can be ignored. The spectral line width is also referred to as a spectral width. For this purpose, a line narrowing module (LNM) having a line narrowing element is provided in a laser resonator of the gas laser device to narrow the spectral width. The line narrowing element may be an etalon, a grating, or the like. A laser device with such a narrowed spectral width is referred to as a line narrowing laser device.

LIST OF DOCUMENTS

Patent Documents

Patent Document 1: US Patent Application Publication No. 2009/0147231
Patent Document 2: US Patent Application Publication No. 2002/0167975
Patent Document 3: US Patent Application Publication No. 2005/0083983
Patent Document 4: Japanese Patent Application Publication No. H07-058393
Patent Document 5: International Publication No. WO2019/079010

SUMMARY

A line narrowing gas laser device according to an aspect of the present disclosure includes an actuator configured to change a center wavelength of pulse laser light, and a processor configured to control the actuator. Here, the processor reads parameters including a number of irradiation pulses of pulse laser light to be radiated to one location of an irradiation receiving object, a shortest wavelength, and a longest wavelength; sets a first pattern with which the center wavelength is changed to approach the longest wavelength from the shortest wavelength and a second pattern with which the center wavelength is changed to approach the shortest wavelength from the longest wavelength such that at least one of the first pattern and the second pattern is different between a case in which the number of irradiation pulses is an even number and a case in which the number of irradiation pulses is an odd number; and controls the actuator so that the first pattern and the second pattern are alternately performed.

A wavelength control method according to an aspect of the present disclosure for controlling a center wavelength of pulse laser light output from a line narrowing gas laser device includes reading parameters including a number of irradiation pulses of pulse laser light to be radiated to one location of an irradiation receiving object, a shortest wavelength, and a longest wavelength; setting a first pattern with which the center wavelength is changed to approach the longest wavelength from the shortest wavelength and a second pattern with which the center wavelength is changed to approach the shortest wavelength from the longest wavelength such that at least one of the first pattern and the second pattern is different between a case in which the number of irradiation pulses is an even number and a case in which the number of irradiation pulses is an odd number; and controlling an actuator that changes the center wavelength so that the first pattern and the second pattern are alternately performed.

An electronic device manufacturing method according to an aspect of the present disclosure includes generating pulse laser light using a line narrowing gas laser device, outputting the pulse laser light to an exposure apparatus, and exposing a photosensitive substrate to the pulse laser light in the exposure apparatus to manufacture an electronic device. Here, the line narrowing gas laser device includes an actuator configured to change a center wavelength of the pulse laser light, and a processor configured to control the actuator. The processor reads parameters including a number of irradiation pulses of the pulse laser light to be radiated to one location of an irradiation receiving object, a shortest wavelength, and a longest wavelength; sets a first pattern with which the center wavelength is changed to approach the longest wavelength from the shortest wavelength and a second pattern with which the center wavelength is changed to approach the shortest wavelength from the longest wavelength such that at least one of the first pattern and the second pattern is different between a case in which the number of irradiation pulses is an even number and a case in which the number of irradiation pulses is an odd number;

and controls the actuator so that the first pattern and the second pattern are alternately performed.

BRIEF DESCRIPTION OF THE DRAWINGS

Embodiments of the present disclosure will be described below merely as examples with reference to the accompanying drawings.

FIG. 18 is a flowchart showing a processing procedure of the wavelength control when the number of irradiation pulses N is an even number in a second embodiment.

FIG. 21 is a flowchart showing a processing procedure of the wavelength control when the number of irradiation pulses N is an odd number in a third embodiment.

DESCRIPTION OF EMBODIMENTS

Figure 1:
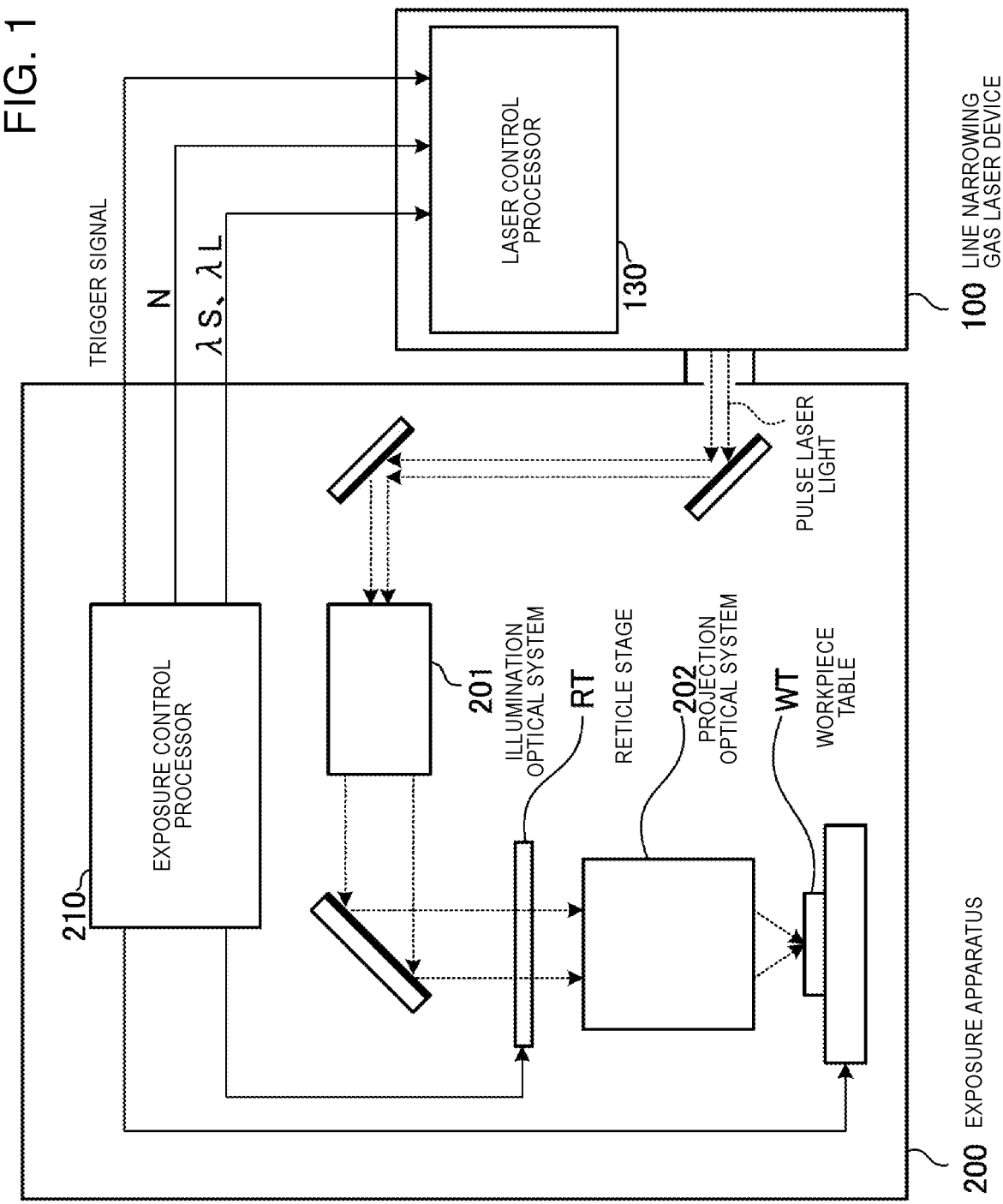
FIG. 1 schematically shows the configuration of an exposure system in a comparative example.

<Contents>
1. Comparative example
    1.1 Exposure system
        1.1.1 Configuration
        1.1.2 Operation
    1.2 Line narrowing gas laser device
        1.2.1 Configuration
        1.2.2 Operation
    1.3 Line narrowing device
        1.3.1 Configuration
        1.3.2 Operation
    1.4 Number of irradiation pulses N
    1.5 Example of periodic wavelength change
    1.6 Problems of comparative example
2. Laser device for setting wavelength change pattern based on number of irradiation pulses N
    2.1 Configuration
    2.2 Main flow
    2.3 Case in which number of irradiation pulses N is even number
    2.4 Specific example of wavelength change
    2.5 Case in which number of irradiation pulses N is odd number
    2.6 Specific example of wavelength change
    2.7 Effect
3. Modification when number of irradiation pulses N is even number
    3.1 Operation
    3.2 Specific example of wavelength change
    3.3 Effect
4. Modification when number of irradiation pulses N is odd number
    4.1 Operation
    4.2 Specific example of wavelength change
    4.3 Effect
5. Others Hereinafter, embodiments of the present disclosure will be described in detail with reference to the drawings. The embodiments described below show some examples of the present disclosure and do not limit the contents of the present disclosure. Also, all configurations and operation described in the embodiments are not necessarily essential as configurations and operation of the present disclosure. Here, the same components are denoted by the same reference numerals, and duplicate description thereof is omitted.

1. COMPARATIVE EXAMPLE 1.1 Exposure System

FIG. 1 schematically shows the configuration of an exposure system in a comparative example. The comparative example of the present disclosure is an example recognized by the applicant as known only by the applicant, and is not a publicly known example admitted by the applicant.

The exposure system includes a line narrowing gas laser device 100 and an exposure apparatus 200. In FIG. 1, the line narrowing gas laser device 100 is shown in a simplified manner.

The line narrowing gas laser device 100 includes a laser control processor 130. The line narrowing gas laser device 100 is configured to output pulse laser light toward the exposure apparatus 200.

1.1.1 Configuration

As shown in FIG. 1, the exposure apparatus 200 includes an illumination optical system 201, a projection optical system 202, and an exposure control processor 210.

The illumination optical system 201 illuminates a reticle pattern of a reticle (not shown) arranged on a reticle stage RT with the pulse laser light having entered from the line narrowing gas laser device 100.

The projection optical system 202 causes the pulse laser light transmitted through the reticle to be imaged as being reduced and projected on a workpiece (not shown) arranged on a workpiece table WT. The workpiece is a photosensitive substrate such as a semiconductor wafer on which a resist film is applied.

The exposure control processor 210 performs overall control of the exposure apparatus 200, and transmits and receives various parameters and various signals to and from the laser control processor 130.

1.1.2 Operation

The exposure control processor 210 transmits various parameters including the shortest wavelength $\lambda S$, the longest wavelength $\lambda L$, and the number of irradiation pulses N and a trigger signal to the laser control processor 130. The laser control processor 130 controls the line narrowing gas laser device 100 in accordance with these parameters and signals.

The exposure control processor 210 synchronously translates the reticle stage RT and the workpiece table WT in opposite directions with each other. Thus, the workpiece is exposed to the pulse laser light reflecting the reticle pattern.

By such an exposure process, the reticle pattern is transferred onto the semiconductor wafer. Thereafter, an electronic device can be manufactured through a plurality of processes.

1.2 Line Narrowing Gas Laser Device 1.2.1 Configuration

Figure 2A:
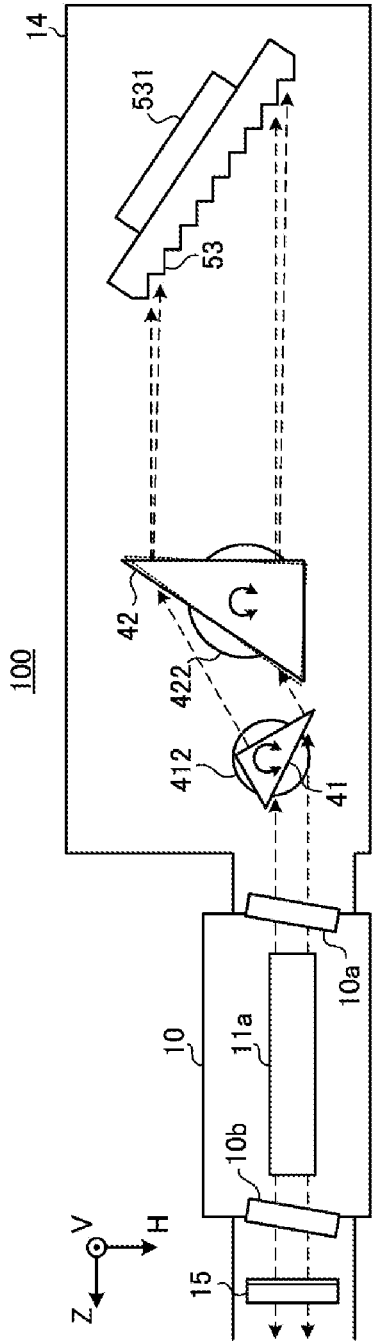
FIGS. 2A and 2B schematically show the configuration of the line narrowing gas laser device of the comparative example.
Figure 2B:
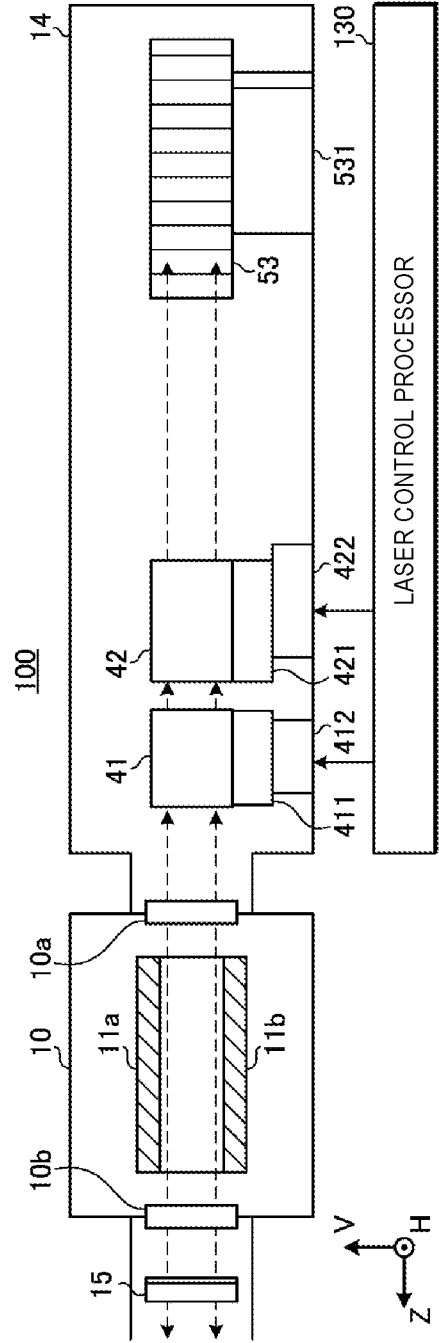

FIGS. 2A and 2B schematically show the configuration of the line narrowing gas laser device of the comparative example. In each drawing, the V-axis, H-axis, and Z-axis perpendicular to one another are shown. FIG. 2A shows the line narrowing gas laser device 100 as viewed in the −V direction, and FIG. 2B shows the line narrowing gas laser device 100 as viewed in the −H direction.

The line narrowing gas laser device 100 includes a laser chamber 10, a line narrowing device 14, and an output coupling mirror 15 in addition to the laser control processor 130. The line narrowing device 14 and the output coupling mirror 15 configure an optical resonator.

The laser chamber 10 is arranged on the optical path of the optical resonator. The laser chamber 10 is provided with two windows 10a, 10b.

The laser chamber 10 accommodates a pair of electrodes 11a, 11b, and further laser gas as a laser medium. The laser medium is, for example, $F_2$, ArF, KrF, XeCl, or XeF.

The −V direction and the +V direction coincide with the direction in which the electrodes 11a, 11b face each other. The −Z direction coincides with the travel direction of the light beam output from the window 10a. The +Z direction coincides with the travel direction of the pulse laser light output from the window 10b and output via the output coupling mirror 15.

The line narrowing device 14 includes first and second prisms 41, 42, and a grating 53.

Details of the line narrowing device 14 will be described later. The output coupling mirror 15 is configured by a partial reflection mirror.

1.2.2 Operation

The laser control processor 130 acquires various parameters including the shortest wavelength $\lambda S$ and the longest wavelength $\lambda L$ as target values of the wavelength and the number of irradiation pulses N from the exposure control processor 210. The laser control processor 130 transmits a control signal to the line narrowing device 14 based on the shortest wavelength $\lambda S$, the longest wavelength $\lambda L$, and the number of irradiation pulses N.

The laser control processor 130 receives a trigger signal from the exposure control processor 210. The laser control processor 130 transmits an oscillation trigger signal based on the trigger signal to a pulse power module (not shown). When receiving the oscillation trigger signal, the pulse power module generates pulse high voltage and applies the high voltage between the electrodes 11a, 11b.

When the high voltage is applied between the electrodes 11a, 11b, discharge occurs between the electrodes 11a, 11b. The laser gas in the laser chamber 10 is excited by the energy of the discharge and shifts to a high energy level. When the excited laser gas then shifts to a low energy level, light having a wavelength corresponding to the difference between the energy levels is emitted.

The light generated in the laser chamber 10 is output to the outside of the laser chamber 10 through the windows 10a, 10b. The light output from the window 10a enters the line narrowing device 14 as a light beam. Among the light having entered the line narrowing device 14, the light having a wavelength near a desired wavelength is turned back by the line narrowing device 14 and returned to the laser chamber 10.

The output coupling mirror 15 transmits and outputs a part of the light output from the window 10b, and reflects the other parts back into the laser chamber 10.

In this way, the light output from the laser chamber 10 reciprocates between the line narrowing device 14 and the output coupling mirror 15. The light is amplified every time when passing through a discharge space between the pair of electrodes 11a, 11b. Further, the light is narrowed each time when being turned back by the line narrowing device 14, and becomes light having a steep wavelength distribution with a part of a range of wavelength selected by the line narrowing device 14 as a center wavelength. Thus, the light having undergone laser oscillation and line narrowing is output as pulse laser light from the output coupling mirror 15. The wavelength of the pulse laser light refers to the center wavelength unless otherwise specified.

The pulse laser light output from the line narrowing gas laser device 100 enters the exposure apparatus 200.

1.3 Line Narrowing Device
1.3.1 Configuration

The first prism 41 is arranged on the optical path of the light beam output from the window 10a. The first prism 41 is supported by a holder 411.

The second prism 42 is arranged on the optical path of the light beam having passed through the first prism 41. The second prism 42 is supported by a holder 421.

The first and second prisms 41, 42 are made of a material such as calcium fluoride and synthetic quartz having a high transmittance for the wavelength selected by the line narrowing device 14.

The first and second prisms 41, 42 are arranged such that the surfaces of the first and second prisms 41, 42 on which the light beam is incident and from which the light beam exits are parallel to the V axis. The first and second prisms 41, 42 are rotatable about an axis parallel to the V axis respectively by rotation stages 412, 422. Here, examples of the rotation stages 412, 422 include a rotation stage having high responsiveness to be rotated by a piezoelectric element.

The grating 53 is arranged on the optical path of the light beam having passed through the second prism 42. The direction of the grooves of the grating 53 coincides with the direction of the V axis.

The grating 53 is supported by a holder 531.

1.3.2 Operation

The travel direction of the light beam output from the window 10a is changed by each of the first and second prisms 41, 42 in a plane parallel to the HZ plane which is a plane perpendicular to the V axis, and the beam width is expanded in the plane parallel to the HZ plane. As an example, the travel direction of the light beam having passed through both the first and second prisms 41, 42 toward the grating 53 substantially coincides with the −Z direction.

The light incident on the grating 53 from the second prism 42 is reflected by a plurality of grooves of the grating 53 and is diffracted in a direction corresponding to the wavelength of the light. Thus, the light reflected by the plurality of grooves of the grating 53 is dispersed in a plane parallel to the HZ plane. The grating 53 is arranged in the Littrow arrangement, which causes the incident angle of the light beam incident on the grating 53 from the second prism 42 to coincide with the diffraction angle of the diffracted light having the desired wavelength.

The second prism 42 and the first prism 41 reduce the beam width of the light returned from the grating 53 in a plane parallel to the HZ plane and return the light into the laser chamber 10 via the window 10a.

The rotation stages 412, 422 are controlled by the laser control processor 130.

When the rotation stage 412 slightly rotates the first prism 41, the travel direction of the light beam output from the first prism 41 toward the grating 53 slightly changes in a plane parallel to the HZ plane. Thus, the incident angle of the light beam incident on the grating 53 from the second prism 42 is slightly changed.

Therefore, the wavelength selected by the line narrowing device 14 is changed. When the rotation stage 422 slightly rotates the second prism 42, the travel direction of the light beam output from the second prism 42 toward the grating 53 slightly changes in a plane parallel to the HZ plane. Thus, the incident angle of the light beam incident on the grating 53 from the second prism 42 is slightly changed. Therefore, the wavelength selected by the line narrowing device 14 is changed.

The laser control processor 130 controls the rotation stage 412 of the first prism 41 based on the shortest wavelength $\lambda S$ received from the exposure control processor 210.

The laser control processor 130 controls the rotation stage 422 of the second prism 42 so as to rotate the second prism 42 little by little each time one pulse of the pulse laser light is output. Thus, the wavelength selected by the line narrowing device 14 is gradually lengthened for each pulse. The rotation stage 422 includes the actuator in the present disclosure.

When the selected wavelength reaches the longest wavelength $\lambda L$ received from the exposure control processor 210, the laser control processor 130 controls the rotation stage 422 to rotate the second prism 42 little by little in the opposite direction. Thus, the wavelength selected by the line narrowing device 14 is gradually shortened for each pulse.

When the selected wavelength returns to the shortest wavelength $\lambda S$, the laser control processor 130 gradually lengthens the selected wavelength again.

In this way, the laser control processor 130 controls the rotation stage 422 so as to change the posture of the second prism 42 for each pulse and periodically change the posture for each plurality of pulses. As a result, the wavelength of the pulse laser light changes in multiple steps between the shortest wavelength $\lambda S$ and the longest wavelength $\lambda L$, and periodically changes for each plurality of pulses.

The focal length in the exposure apparatus 200 (see FIG. 1) depends on the wavelength of the pulse laser light. The pulse laser light output from the line narrowing gas laser device 100 through multiple wavelength oscillation can be focused at a number of different positions in the direction of the optical path axis of the pulse laser light, and the focal depth can be substantially increased. For example, even when a resist film having a large thickness is exposed, the imaging performance in the thickness direction of the resist film can be maintained.

1.4 Number of Irradiation Pulses N

Figure 3A:
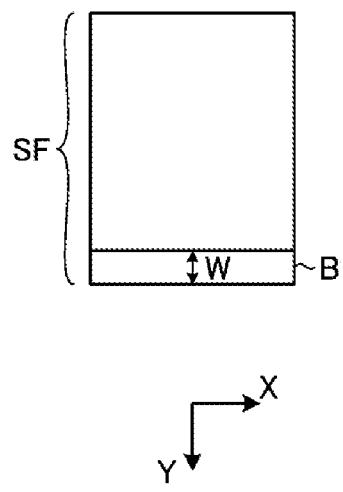
FIGS. 3A to 3C show how the position of a scan field SF of an irradiation receiving object changes with respect to the position of the pulse laser light.
Figure 3B:
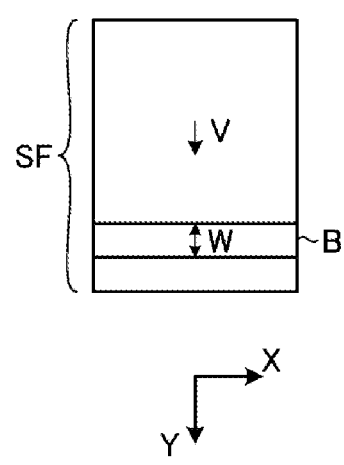
Figure 3C:
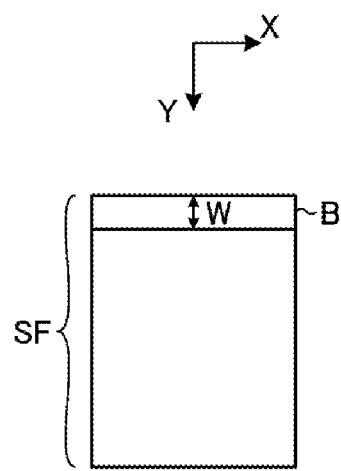

FIGS. 3A to 3C show how the position of a scan field SF of an irradiation receiving object changes with respect to the position of the pulse laser light. The irradiation receiving object is, for example, a semiconductor wafer. The scan field SF of a semiconductor wafer corresponds, for example, to a region where some semiconductor chips among a number of semiconductor chips to be formed in a semiconductor wafer are formed. A resist film is applied to the scan field SF. The width of the scan field SF in the X-axis direction is the same as the width of a beam cross section B of the pulse laser light in the X-axis direction at the position of the irradiation receiving object. The width of the scan field SF in the Y-axis direction is larger than the width W of the beam cross section B of the pulse laser light in the Y-axis direction at the position of the irradiation receiving object.

The procedure of exposing the scan field SF with the pulse laser light is performed in the order of FIGS. 3A, 3B, and 3C. First, as shown in FIG. 3A, the workpiece table WT is positioned so that the position of the pulse laser light coincides with one end of the scan field SF in the Y-axis direction, and exposure is started. Next, as shown in FIG. 3B, the workpiece table WT is moved so that the scan field SF moves at a velocity V with respect to the position of the pulse laser light. As shown in FIG. 3C, when the workpiece table WT is moved until the position of the pulse laser light coincides with the other end of the scan field SF in the Y-axis direction, the exposure of the scan field SF is completed. In this way, the exposure is performed while the scan field SF moves with respect to the position of the pulse laser light.

The required time T for the scan field SF to move by the distance corresponding to the width W of the beam cross section B of the pulse laser light at the velocity V is as follows.

$$T=W/V$$

The number of irradiation pulses N of the pulse laser light radiated to any one location of the scan field SF is the same as the number of pulses of the pulse laser light generated in the required time T as follows.

$$N=F\cdot T=F\cdot W/V$$

Here, F is the repetition frequency of the pulse laser light. The number of irradiation pulses N is also referred to as an N slit pulse number.

1.5 Example of Periodic Wavelength Change

Figure 4:
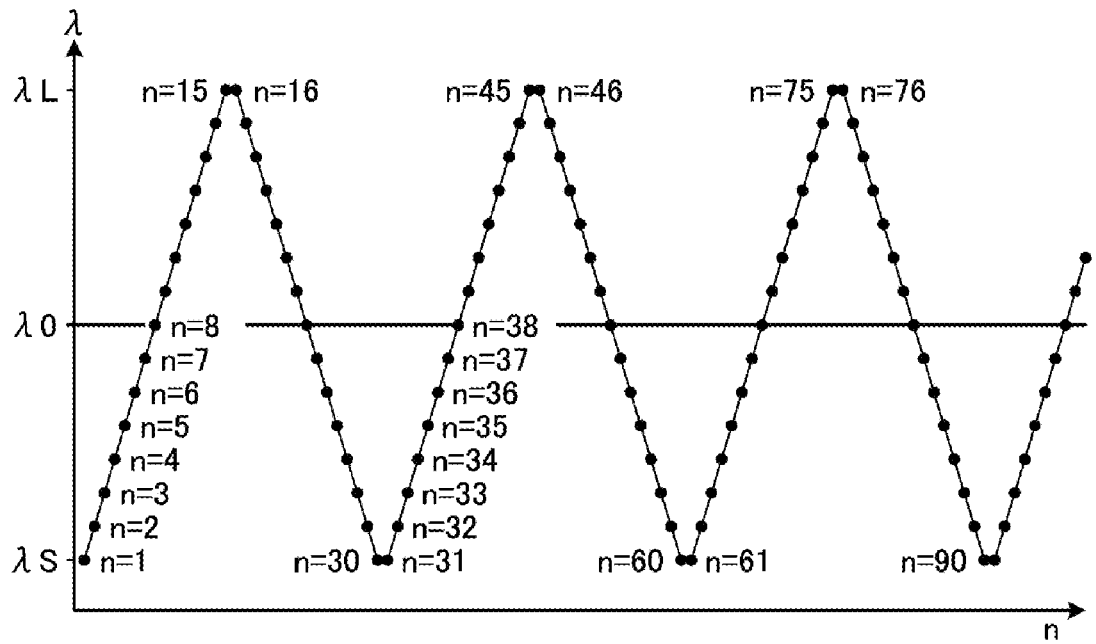
FIG. 4 is a graph showing a periodic wavelength change in the comparative example.

FIG. 4 is a graph showing a periodic wavelength change in the comparative example. In FIG. 4, the horizontal axis represents pulse number n and the vertical axis represents wavelength λ.

In the example shown in FIG. 4, the wavelength λ periodically changes every 30 pulses between the shortest wavelength λS and the longest wavelength λL. Specifically, while the pulse laser light of 15 pulses from the first (n=1) to the 15th (n=15) is generated, the wavelength changes from the shortest wavelength λS to the longest wavelength λL to be lengthened by a constant wavelength change amount for each pulse. Thereafter, while the pulse laser light of 15 pulses from the 16th (n=16) to the 30th (n=30) is generated, the wavelength λ changes from the longest wavelength λL to the shortest wavelength λS to be shortened by a constant wavelength change amount for each pulse. Similarly thereafter, generation of 15 pulses while lengthening the wavelength and generation of 15 pulses while shortening the wavelength are repeated. The average value of the shortest wavelength λS and the longest wavelength λL is set as λ0.

Figure 5:
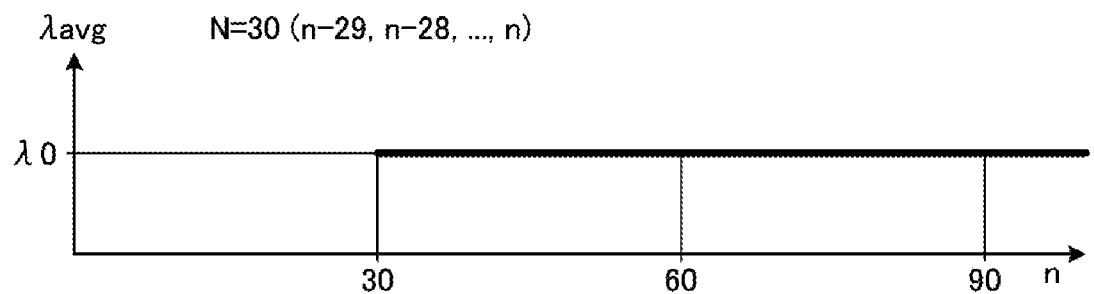
FIG. 5 is a graph showing a moving average for every 30 pulses in the wavelength change shown in FIG. 4.

FIG. 5 is a graph showing a moving average for every 30 pulses in the wavelength change shown in FIG. 4. In FIG. 5, the horizontal axis represents the pulse number n, and the vertical axis represents a moving average λavg for every 30 pulses. The moving average λavg for every 30 pulses is expressed by the following equation.

$$\lambda avg=(\lambda(n-29)+\lambda(n-28)+\ldots+(n))/30$$

Here, λ(X) is the wavelength λ when the pulse number n is X. For example, the moving average λavg when the pulse number n is 30 corresponds to the arithmetic average of the wavelengths λ of 30 pulses from the first (n=1) to the thirtieth (n=30).

In the wavelength change shown in FIG. 4, the moving average λavg for every 30 pulses is constant regardless of the value of the pulse number n, and this moving average λavg coincides with the average value λ0 shown in FIG. 4.

The constant moving average λavg for every 30 pulses has the following advantages. That is, when the number of irradiation pulses N described with reference to FIGS. 3A to 3C is 30 (N=30), the pulse laser light of any 30 pulses with which a part of the scan field SF of the irradiation receiving object is irradiated has the same average wavelength. This makes it possible to manufacture a high-quality electronic device with little variation in the exposure result depending on the irradiation position.

Figure 6:
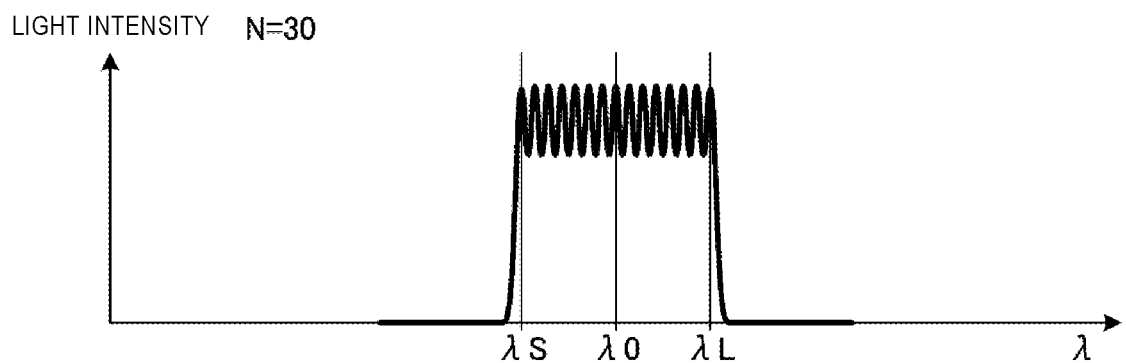
FIG. 6 is a graph showing integrated spectrum of 30 pulses in the wavelength change shown in FIG. 4.

FIG. 6 is a graph showing the integrated spectrum of 30 pulses in the wavelength change shown in FIG. 4. In FIG. 6, the horizontal axis represents the wavelength λ and the vertical axis represents light intensity. In the wavelength change shown in FIG. 4, since the wavelength is changed in multiple steps between the shortest wavelength λS and the longest wavelength λL, a large number of wavelength peaks appear between the shortest wavelength λS and the longest wavelength λL in the integrated spectrum shown in FIG. 6. If the light intensity of 30 pulses is maintained substantially constant, a large number of wavelength peaks shown in FIG. 6 have substantially the same light intensity, and it is possible to make the integrated spectrum have a substantially flat top shape.

1.6 Problems of Comparative Example

Figure 7:
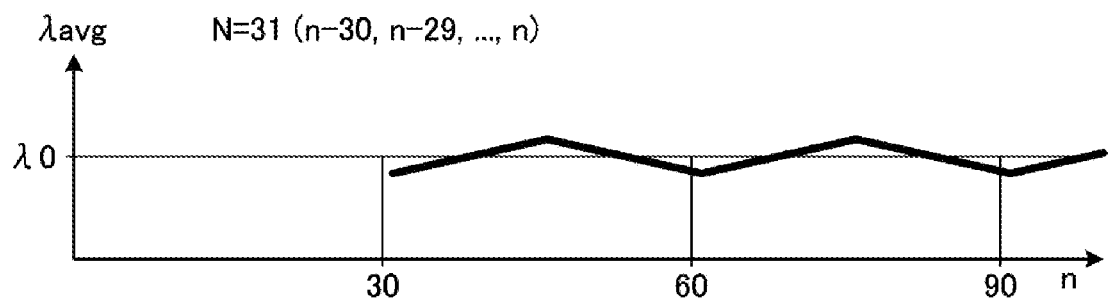
FIG. 7 is a graph showing a moving average for every 31 pulses in the wavelength change shown in FIG. 4.

FIG. 7 is a graph showing a moving average for every 31 pulses in the wavelength change shown in FIG. 4. In FIG. 7, the horizontal axis represents the pulse number n, and the vertical axis represents the moving average λavg for every 31 pulses. The moving average λavg for every 31 pulses is expressed by the following equation.

$$\lambda avg=(\lambda(n-30)+\lambda(n-29)+\ldots+\lambda(n))/31$$

In the wavelength change shown in FIG. 4, compared to the 30 pulses from the 1st (n=1) to 30th (n=30), the 31 pulses from the 1st (n=1) to 31st (n=31) are added with the 31st (n=31) pulse having the shortest wavelength λS. Therefore, the average value of the wavelength λ of the 31 pulses is smaller than λ0.

Further, compared with the 31 pulses from the 1st (n=1) to the 31st (n=31), in the 31 pulses from the 2nd (n=2) to the 32nd (n=32), the 1st pulse (n=1) having the shortest wavelength λS is excluded in correspondence with adding the 32nd pulse (n=32). Therefore, the average value of the wavelength λ of the 31 pulses from the 2nd (n=2) to the 32nd (n=32) is slightly larger than that of the 31 pulses from the 1st (n=1) to the 31st (n=31).

Thus, the moving average λavg for every 31 pulses varies depending on how 31 successive pulses are chosen. Therefore, when the number of irradiation pulses N described with reference to FIGS. 3A to 3C is 31 (N=31), the average wavelength will differ depending on the irradiation position in the scan field SF. In this case, the exposure result varies depending on the irradiation position, which may affect the quality of the electronic device.

Figure 8:
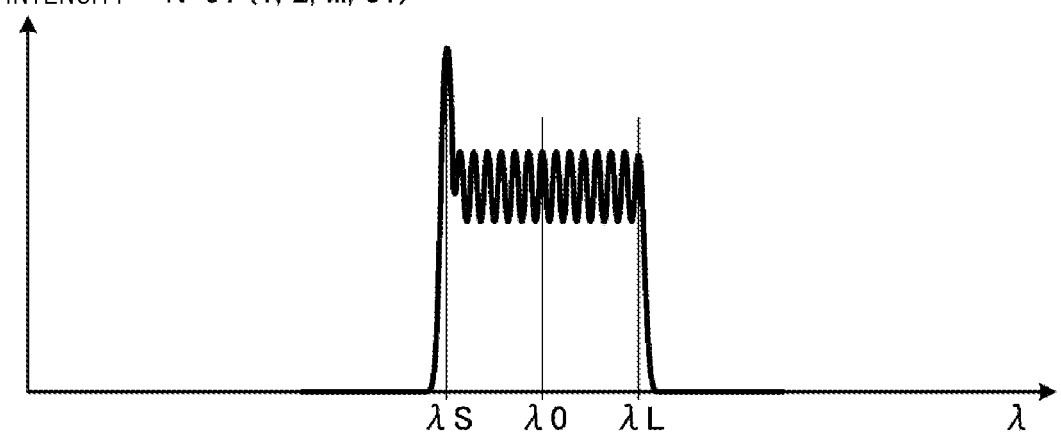
FIG. 8 is a graph showing the integrated spectrum of 31 pulses from the 1st to the 31st in the wavelength change shown in FIG. 4.

FIG. 8 is a graph showing the integrated spectrum of 31 pulses from the 1st (n=1) to the 31st (n=31) in the wavelength change shown in FIG. 4. In FIG. 8, the horizontal axis represents the wavelength λ and the vertical axis represents the light intensity. For the 31 pulses from the 1st (n=1) to the 31st (n=31), since the 31st pulse (n=31) having the shortest wavelength λS is added to the 30 pulses from the 1st (n=1) to the 30th (n=30), a high peak appears in the vicinity of the shortest wavelength λS.

Figure 9:
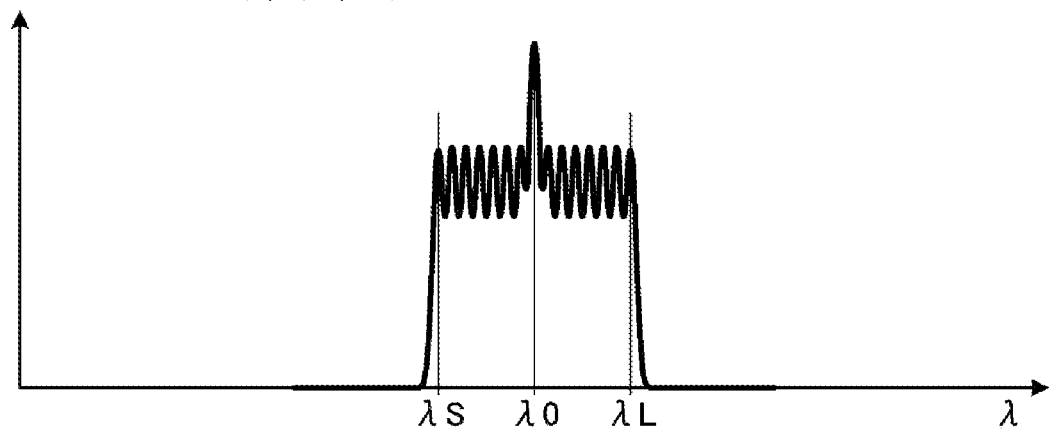
FIG. 9 is a graph showing the integrated spectrum of 31 pulses from the 8th to the 38th in the wavelength change shown in FIG. 4.

FIG. 9 is a graph showing the integrated spectrum of 31 pulses from the 8th (n=8) to the 38th (n=38) in the wavelength change shown in FIG. 4. In FIG. 9, the horizontal axis represents the wavelength λ and the vertical axis represents the light intensity. For the 31 pulses from the 8th (n=8) to the 38th (n=38), since the 38th pulse (n=38) having a wavelength near the average wavelength λ0 is added to the 30 pulses from the 8th (n=8) to the 37th (n=37), a high peak appears in the vicinity of the average wavelength λ0.

As shown in FIGS. 8 and 9, in the wavelength change shown in FIG. 4, there is a case in which the integrated spectrum of 31 pulses cannot realize a flat top shape. Further, the shape of the integrated spectrum of the 31 pulses varies depending on how the continuous 31 pulses are selected, and the exposure result varies depending on the irradiation position, which may affect the quality of the electronic device.

In some embodiments described below, the wavelength change pattern is set based on the number of irradiation pulses N of the pulse laser light to be radiated to one location. The wavelength change pattern is made to vary depending on whether the number of irradiation pulses N is an even number or an odd number.

Figure 10:
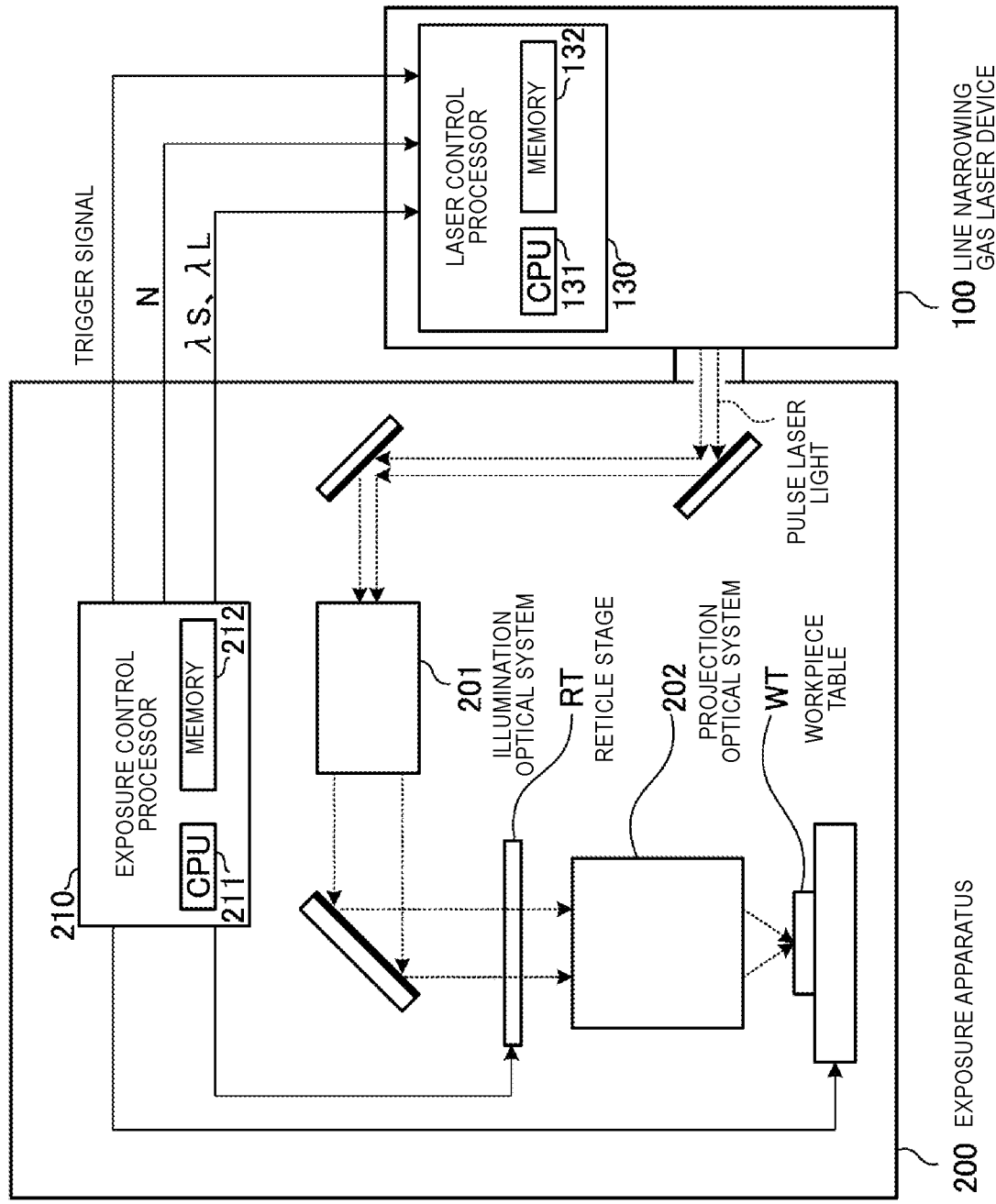
FIG. 10 schematically shows the configuration of the exposure system according to a first embodiment.

2. LASER DEVICE FOR SETTING WAVELENGTH CHANGE PATTERN BASED ON NUMBER OF IRRADIATION PULSES N 2.1 Configuration FIG. 10 schematically shows the configuration of the exposure system according to a first embodiment. The laser control processor 130 included in the line narrowing gas laser device 100 of the first embodiment is a processing device including a memory 132 in which a control program is stored, and a central processing unit (CPU) 131 which executes the control program.

The exposure control processor 210 included in the exposure apparatus 200 is a processing device including a memory 212 in which a control program is stored and a CPU 211 which executes the control program.

The laser control processor 130 and the exposure control processor 210 are specially configured or programmed to perform various processes included in the present disclosure.

The laser control processor 130 is configured to set a wavelength change pattern based on the shortest wavelength $\lambda S$, the longest wavelength $\lambda L$, and the number of irradiation pulses N.

In other respects, the configuration of the first embodiment is similar to that of the comparative example.

Various parameters including the shortest wavelength $\lambda S$, the longest wavelength $\lambda L$ and the number of irradiation pulses N are not limited to those received from the exposure control processor 210, but may be those received from an external apparatus. For example, the various parameters may be received from a lithography control processor (not shown) arranged separately from the exposure apparatus 200. The lithography control processor may be connected to a plurality of the exposure control processors 210 included in a plurality of the exposure apparatuses 200 installed in a semiconductor factory.

Alternatively, the exposure control processor 210 or the lithography control processor may read various parameters including the shortest wavelength $\lambda S$, the longest wavelength $\lambda L$, and the number of irradiation pulses N, set the wavelength change pattern, and output the target wavelength to the laser control processor 130. In this case, the exposure control processor 210 or the lithography control processor may perform processing similar to the processing of the laser control processor 130 described below.

2.2 Main flow

Figure 11:
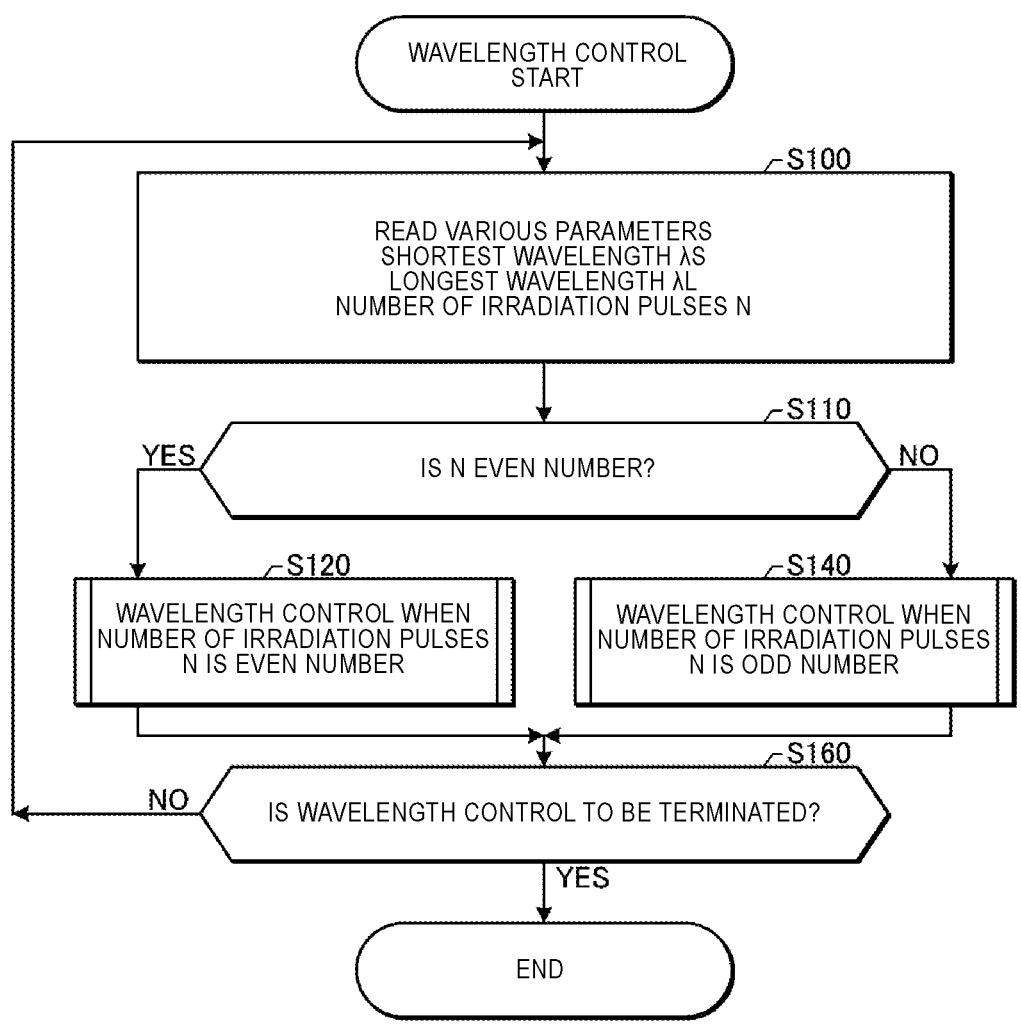
FIG. 11 is a flowchart showing a processing procedure of wavelength control by the laser control processor.

FIG. 11 is a flowchart showing a processing procedure of wavelength control by the laser control processor 130. The laser control processor 130 sets the wavelength change pattern and performs the wavelength control by the following processing.

In S100, the laser control processor 130 reads various parameters received from an external apparatus such as the exposure control processor 210. The various parameters include the shortest wavelength $\lambda S$, the longest wavelength $\lambda L$, and the number of irradiation pulses N of the pulse laser light with which one location is irradiated.

Next, in S110, the laser control processor 130 determines whether or not the number of irradiation pulses N is an even number. When the number of irradiation pulses N is an even number (S110: YES), the laser control processor 130 advances processing to S120. When the number of irradiation pulses N is an odd number (S110: NO), the laser control processor 130 advances processing to S140.

In S120, the laser control processor 130 performs the wavelength control when the number of irradiation pulses N is an even number. Details of S120 will be described later with reference to FIGS. 12 and 13. After S120, the laser control processor 130 advances processing to S160.

In S140, the laser control processor 130 performs the wavelength control when the number of irradiation pulses N is an odd number. Details of S140 will be described later with reference to FIGS. 15 and 16. After S140, the laser control processor 130 advances processing to S160.

In S160, the laser control processor 130 determines whether or not to terminate the wavelength control. When the wavelength control is not to be terminated (S160: NO), the laser control processor 130 returns processing to S100. When the wavelength control is to be terminated (S160: YES), the laser control processor 130 ends processing of the present flowchart.

2.3 Case in Which Number of Irradiation Pulses N is Even Number

Figure 12:
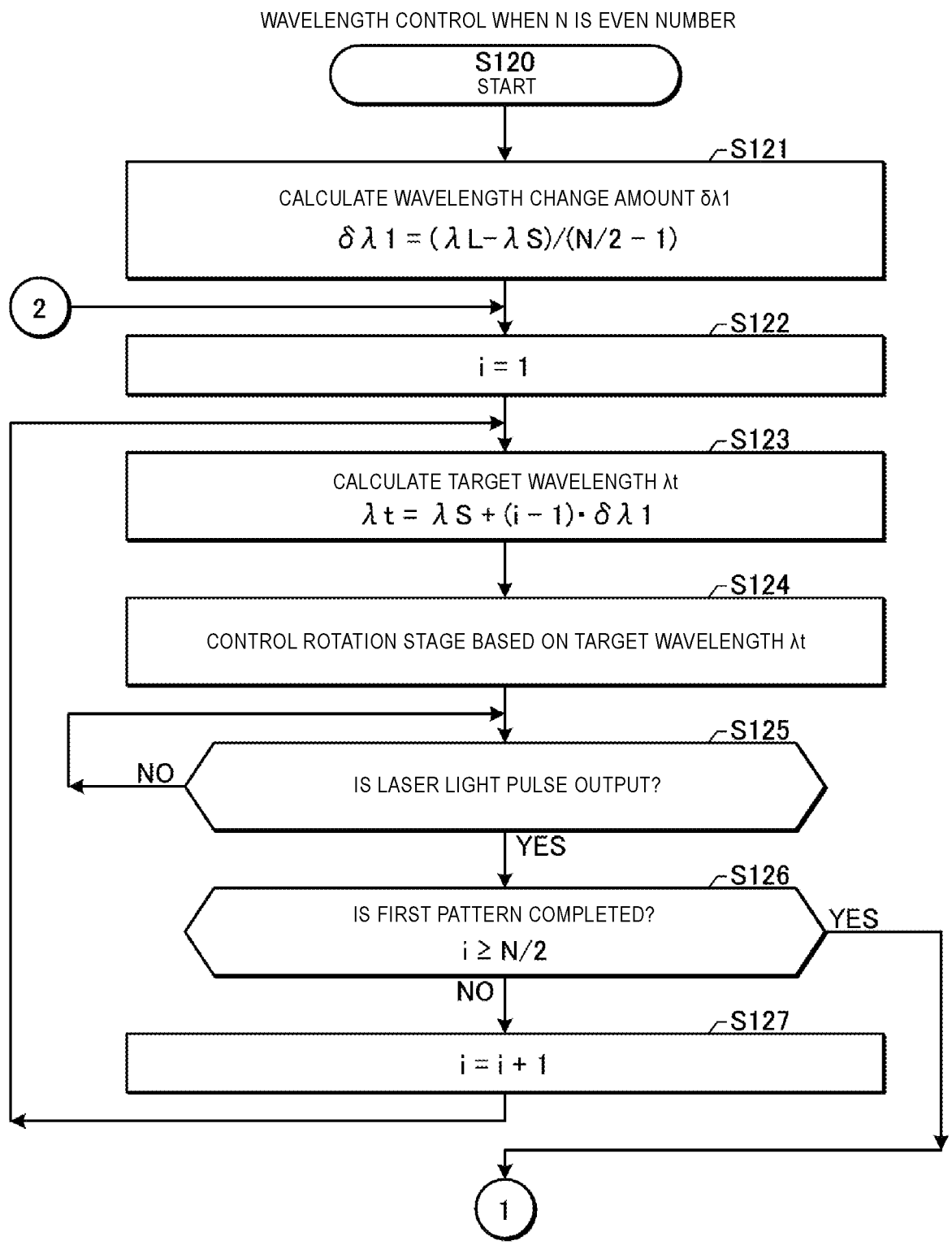
FIG. 12 is a flowchart showing a processing procedure of the wavelength control when the number of irradiation pulses N is an even number in the first embodiment.
Figure 13:
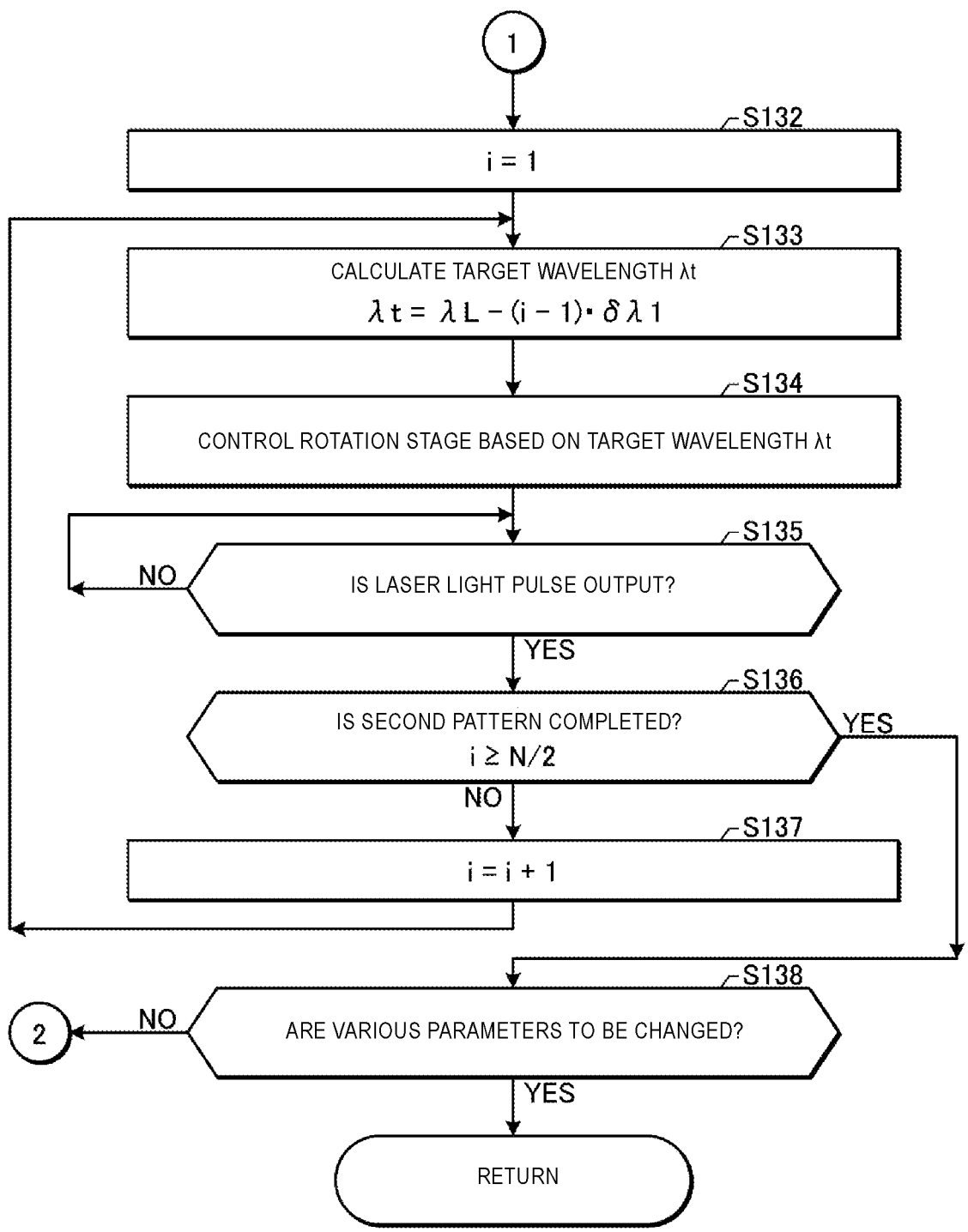
FIG. 13 is a flowchart showing a processing procedure of the wavelength control when the number of irradiation pulses N is an even number in the first embodiment.

FIGS. 12 and 13 are flowcharts showing a processing procedure of the wavelength control when the number of irradiation pulses N is an even number in the first embodiment. The processing shown in FIGS. 12 and 13 corresponds to the subroutine of S120 in FIG. 11.

For example, when the number of irradiation pulses N of the pulse laser light radiated to one location is 30 (N=30), the wavelength change pattern is set as follows in the first embodiment.

The period of the wavelength change is assumed to be 30 pulses.

In the first 15 pulses among the 30 pulses, the wavelength change is performed with a first pattern in which the wavelength $\lambda$ is changed to approach the longest wavelength $\lambda L$ from the shortest wavelength $\lambda S$ (S122 to S127).

In the last 15 pulses among the 30 pulses, the wavelength change is performed with a second pattern in which the wavelength $\lambda$ is changed to approach the shortest wavelength $\lambda S$ from the longest wavelength $\lambda L$ (S132 to S137).

First, in S121, the laser control processor 130 calculates a wavelength change amount $\delta\lambda_1$ by the following equation. The wavelength change amount $\delta\lambda_1$ is a value that defines a change amount of the wavelength for each pulse.

$$\delta\lambda_1 = (\lambda L - \lambda S)/(N/2 - 1)$$

When the number of irradiation pulses N is 30 (N=30), the wavelength change amount $\delta\lambda_1$ is a value obtained by dividing the difference between the longest wavelength $\lambda L$ and the shortest wavelength $\lambda S$ by 14.

In the subsequent processes from S122 to S127, the wavelength change is performed with the first pattern.

In S122, the laser control processor 130 sets a counter i for counting the number of pulses to 1.

Next, in S123, the laser control processor 130 calculates the target wavelength $\lambda t$ by the following equation.

$$\lambda t = \lambda S + (i-1) \cdot \delta\lambda_1$$

When the value of the counter i is 1 (i=1), the target wavelength $\lambda t$ is the shortest wavelength $\lambda S$.

As the value of the counter i increases by 1, the target wavelength λt increases by the wavelength change amount $\delta\lambda_1$.

Next, in S124, the laser control processor 130 controls the rotation stage 422 of the second prism 42 based on the target wavelength λt.

Next, in S125, the laser control processor 130 determines whether or not a laser light pulse is output. Whether or not a laser light pulse is output may be determined by whether or not the laser control processor 130 has output an oscillation trigger signal, or may be determined by whether or not a photodetector (not shown) has detected the laser light pulse. When the laser light pulse is not output (S125: NO), the laser control processor 130 waits until the laser light pulse is output. When the laser light pulse is output (S125: YES), the laser control processor 130 advances processing to λ126.

In S126, the laser control processor 130 determines whether or not the first pattern is completed based on whether or not the value of the counter i is equal to or larger than N/2.

In the case that the number of irradiation pulses N is 30 (N=30), when the value of the counter i has not reached 15, it means that the output of the first 15 pulses among 30 pulses is not completed. Therefore, the laser control processor 130 determines that the first pattern is not completed (S126: NO) and advances processing to S127.

When the value of the counter i has reached 15, it means that the first 15 pulses have been output. Therefore, the laser control processor 130 determines that the first pattern is completed (S126: YES) and advances processing to S132 in FIG. 13.

In S127, the laser control processor 130 adds 1 to the value of the counter i and returns to S123.

In the subsequent processes from S132 to S137, the wavelength change is performed with the second pattern.

In S132, the laser control processor 130 sets the counter i for counting the number of pulses to 1 again.

Next, in S133, the laser control processor 130 calculates the target wavelength λt by the following equation.

$$\lambda t = \lambda L - (i-1) \cdot \delta\lambda_1$$

When the value of the counter i is 1 (i=1), the target wavelength λt is the longest wavelength λL.

As the value of the counter i is increased by 1, the target wavelength λt is changed by the wavelength change amount $-\delta\lambda_1$, and the value of the target wavelength λt is decreased.

The subsequent processes of S134 and S135 are the same as the processes of S124 and S125 in FIG. 12, respectively.

Next, in S136, the laser control processor 130 determines whether or not the second pattern is completed based on whether or not the value of the counter i is equal to or larger than N/2.

In the case that the number of irradiation pulses N is 30 (N=30), when the value of the counter i has not reached 15, it means that the output of the last 15 pulses among 30 pulses is not completed. Therefore, the laser control processor 130 determines that the second pattern is not completed (S136: NO) and advances processing to S137.

When the value of the counter i has reached 15, it means that the last 15 pulses have been output. Therefore, the laser control processor 130 determines that the second pattern is completed (S136: YES) and advances processing to S138.

In S137, the laser control processor 130 adds 1 to the value of the counter i and returns to S133.

In S138, the laser control processor 130 determines whether or not to change the various parameters. For example, when parameters such as the shortest wavelength λS and the longest wavelength λL are newly received from the exposure control processor 210, it is determined to change the various parameters.

When the various parameters are to be changed (S138: YES), the laser control processor 130 ends processing of the present flowchart, and returns to processing shown in FIG. 11.

When the various parameters are not to be changed (S138: NO), the laser control processor 130 returns to S122 of FIG. 12. By repeating the processes from S122 to S138 of FIG. 13, the first pattern and the second pattern are alternately performed.

2.4 Specific Example of Wavelength Change

Figure 14A:
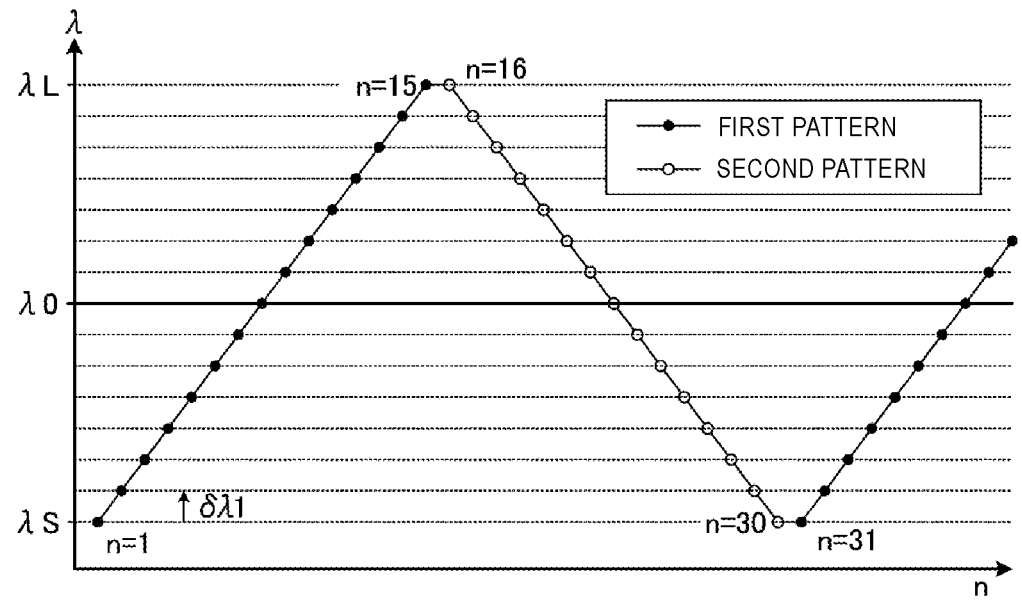
FIG. 14A is a graph showing the wavelength change set when the number of irradiation pulses N is an even number in the first embodiment.

FIG. 14A is a graph showing the wavelength change set when the number of irradiation pulses N is an even number in the first embodiment. In FIG. 14A, the horizontal axis represents the pulse number n and the vertical axis represents the wavelength λ.

The first pattern of the wavelength change includes 15 pulses from the 1st (n=1) to the 15th (n=15). The first pattern starts from the shortest wavelength λS, changes the wavelength by the wavelength change amount $\delta\lambda_1$ for each pulse, and finally reaches the longest wavelength λL.

The second pattern of the wavelength change includes 15 pulses from the 16th (n=16) to the 30th (n=30). The second pattern starts from the longest wavelength λL, changes the wavelength by the wavelength change amount $-\delta\lambda_1$ for each pulse, and finally reaches the shortest wavelength λS.

By setting the first pattern and the second pattern in this way, since the wavelength change pattern becomes a periodic pattern for every 30 pulses, the moving average for every 30 pulses becomes constant regardless of how the continuous 30 pulses are selected.

Figure 14B:
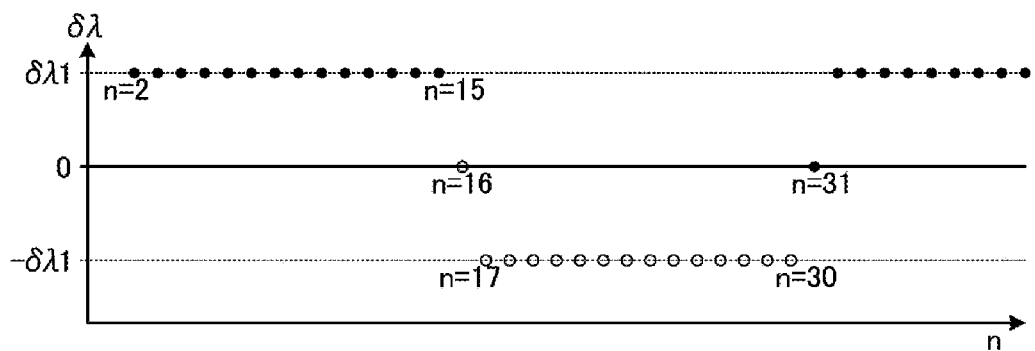
FIG. 14B is a graph showing transition of the wavelength change amount when the number of irradiation pulses N is an even number in the first embodiment.

FIG. 14B is a graph showing transition of the wavelength change amount when the number of irradiation pulses N is an even number in the first embodiment. In FIG. 14B, the horizontal axis represents the pulse number n and the vertical axis represents the wavelength change amount δλ.

The wavelength change amount δλ is constant at $\delta\lambda_1$ for 14 pulses from the 2nd (n=2) to the 15th (n=15). That is, the wavelength λ is increased by $\delta\lambda_1$ with respect to the previous pulse.

The wavelength change amount δλ is 0 for the 16th pulse (n=16). That is, the wavelength λ does not change with respect to the previous pulse.

The wavelength change amount δλ is constant at $-\delta\lambda_1$ for 14 pulses from the 17th (n=17) to the 30th (n=30). That is, the wavelength λ changes by $-\delta\lambda_1$ with respect to the previous pulse, and the value of the wavelength λ is decreased.

The wavelength change amount δλ is 0 for the 31st pulse (n=31). That is, the wavelength λ does not change with respect to the previous pulse.

When the number of irradiation pulses N is an even number in the first embodiment, the wavelength λ repeatedly increases and decreases as described above.

Figure 14C:
FIG. 14C is a graph showing the integrated spectrum of 30 pulses in the wavelength change shown in FIG. 14A.

FIG. 14C is a graph showing the integrated spectrum of 30 pulses in the wavelength change shown in FIG. 14A. In FIG. 14C, the horizontal axis represents the wavelength and the vertical axis represents the light intensity. In the wavelength change shown in FIG. 14A, since the wavelength is changed in multiple steps between the shortest wavelength λS and the longest wavelength λL, a large number of wavelength peaks appear between the shortest wavelength λS and the longest wavelength λL in the integrated spectrum shown in FIG. 14C. If the light intensity of 30 pulses is maintained substantially constant, a large number of wavelength peaks shown in FIG. 14C have substantially the same light intensity, and it is possible to make the integrated spectrum have a substantially flat top shape.

2.5 Case in Which Number of Irradiation Pulses N is Odd Number

Figure 15:
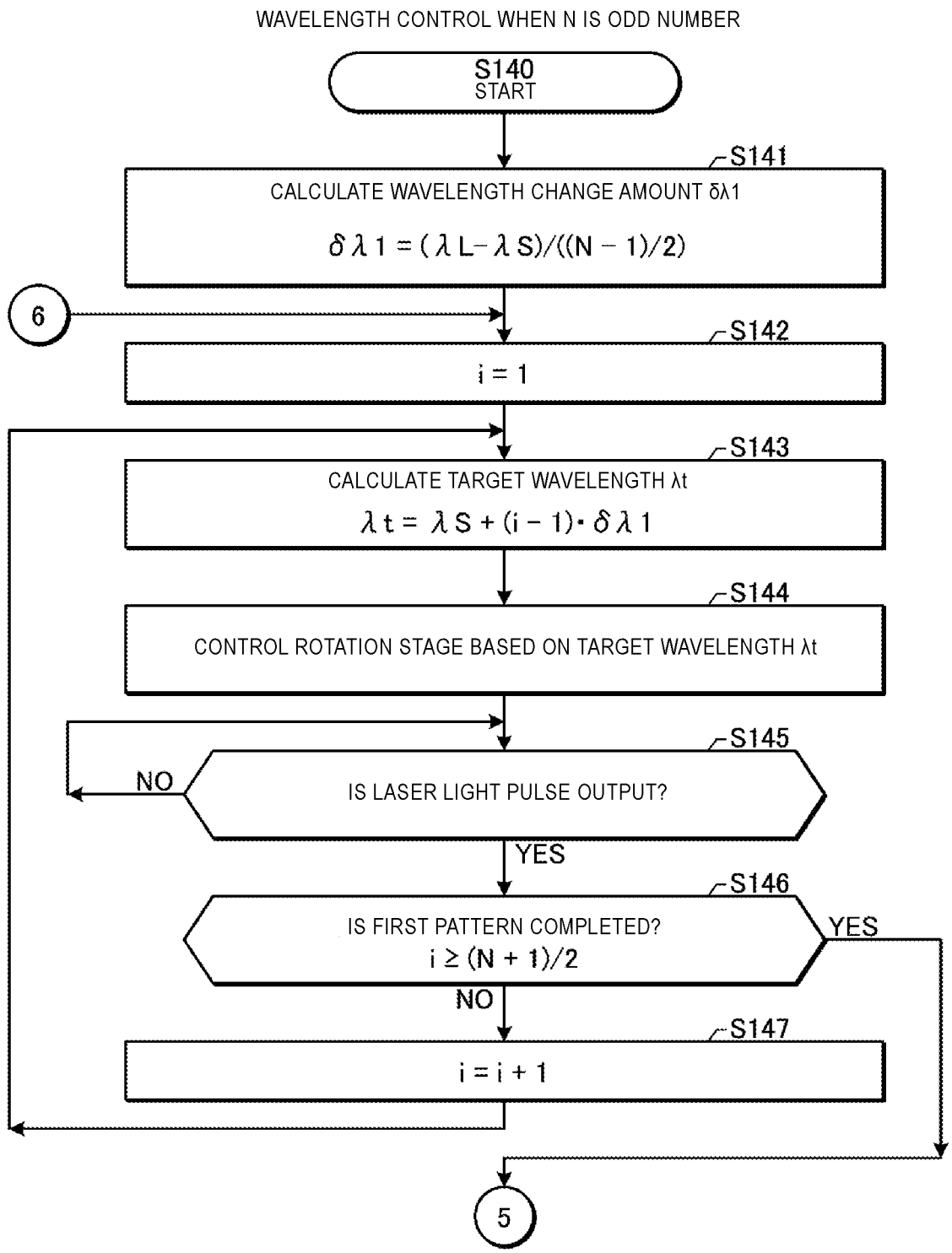
FIG. 15 is a flowchart showing a processing procedure of the wavelength control when the number of irradiation pulses N is an odd number in the first embodiment.
Figure 16:
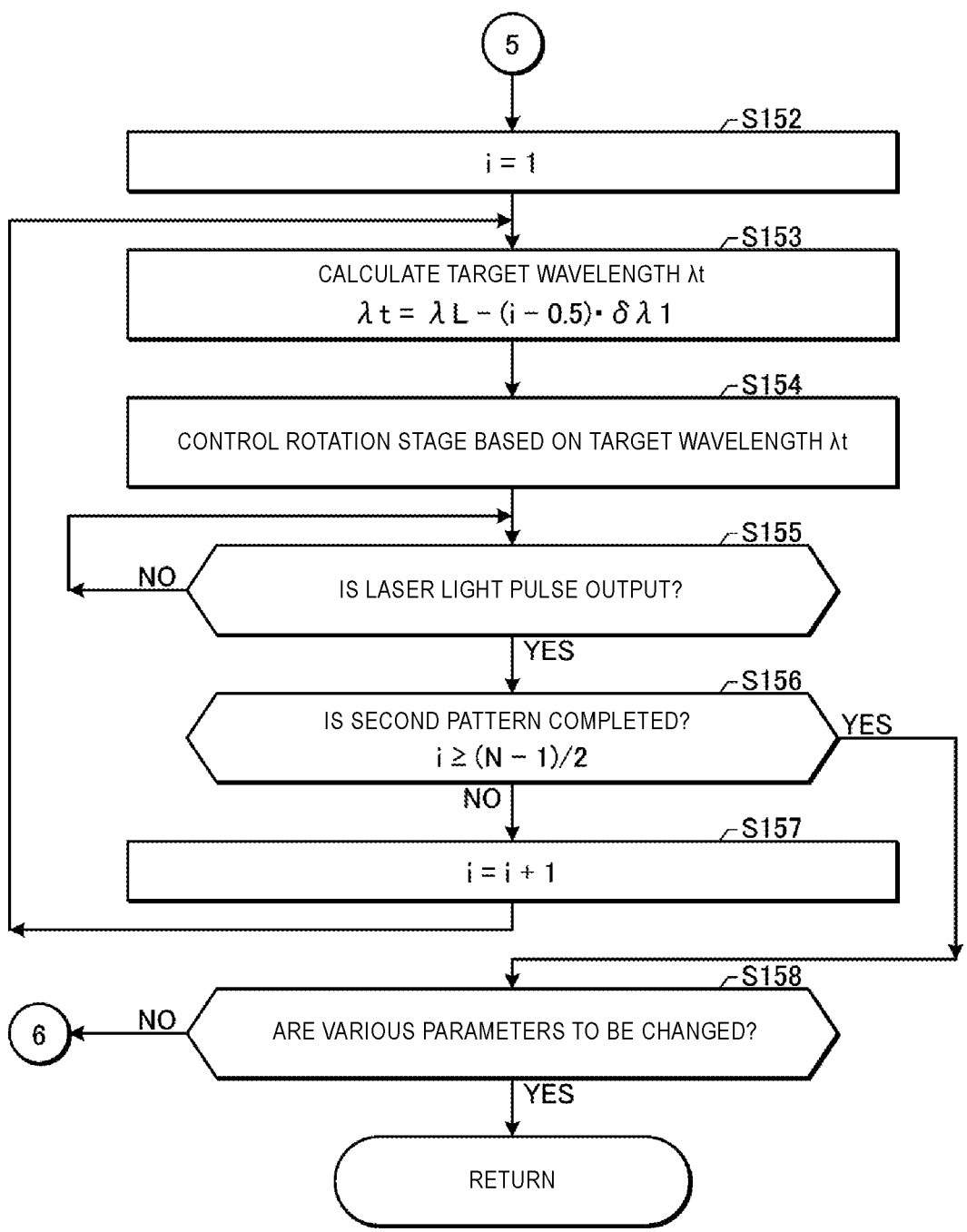
FIG. 16 is a flowchart showing a processing procedure of the wavelength control when the number of irradiation pulses N is an odd number in the first embodiment.

FIGS. 15 and 16 are flowcharts showing a processing procedure of the wavelength control when the number of irradiation pulses N is an odd number in the first embodiment. The processing shown in FIGS. 15 and 16 corresponds to the subroutine of S140 in FIG. 11.

For example, when the number of irradiation pulses N of the pulse laser light radiated to one location is 31 (N=31), the wavelength change pattern is set as follows in the first embodiment.

The period of the wavelength change is assumed to be 31 pulses.

In the first 16 pulses among the 31 pulses, the first pattern is performed so that the wavelength λ is changed to approach the longest wavelength λL from the shortest wavelength λS.

In the last 15 pulses among the 31 pulses, the second pattern is performed so that the wavelength λ is changed to approach the shortest wavelength λL from the longest wavelength λS.

First, in S141, the laser control processor 130 calculates a wavelength change amount $\delta\lambda_1$ by the following equation.

$$\delta\lambda_1 = (\lambda L - \lambda S)/((N-1)/2)$$

When the number of irradiation pulses N is 31 (N=31), the wavelength change amount $\delta\lambda_1$ is a value obtained by dividing the difference between the longest wavelength λL and the shortest wavelength λS by 15.

In the subsequent processes from S142 to S147, the wavelength change is performed with the first pattern.

The processes of S142 to S145 are similar to the processes of S122 to S125 in FIG. 12, respectively.

In S146, the laser control processor 130 determines whether or not the first pattern is completed based on whether or not the value of the counter i is equal to or larger than (N+1)/2.

In the case that the number of irradiation pulses N is 31 (N=31), when the value of the counter i has not reached 16, it means that the output of the first 16 pulses among 31 pulses is not completed. Therefore, the laser control processor 130 determines that the first pattern is not completed (S146: NO) and advances processing to S147.

When the value of the counter i has reached 16, it means that the first 16 pulses has been output. Therefore, the laser control processor 130 determines that the first pattern is completed (S146: YES) and advances processing to S152 in FIG. 16.

In S147, the laser control processor 130 adds 1 to the value of the counter i and returns to S143.

In the processes from S152 to S157 of FIG. 16, the wavelength change is performed with the second pattern. In S152, the laser control processor 130 sets the counter i for counting the number of pulses to 1 again.

Next, in S153, the laser control processor 130 calculates the target wavelength λt by the following equation.

$$\lambda t = \lambda L - (i - 0.5) \cdot \delta\lambda_1$$

When the value of the counter i is 1 (i=1), the target wavelength λt is a value obtained by subtracting half of $\delta\lambda_1$ from the longest wavelength λL.

As the value of the counter i is increased by 1, the target wavelength λt is changed by the wavelength change amount $-\delta\lambda_1$, and the value of the target wavelength λt is decreased.

The subsequent processes of S154 and S155 are the same as the processes of S124 and S125 in FIG. 12, respectively.

Next, in S156, the laser control processor 130 determines whether or not the second pattern is completed based on whether or not the value of the counter i is equal to or larger than (N−1)/2.

In the case that the number of irradiation pulses N is 31 (N=31), when the value of the counter i has not reached 15, it means that the output of the last 15 pulses among 31 pulses is not completed. Therefore, the laser control processor 130 determines that the second pattern is not completed (S156: NO) and advances processing to S157.

When the value of the counter i has reached 15, it means that the last 15 pulses have been output. Therefore, the laser control processor 130 determines that the second pattern is completed (S156: YES) and advances processing to S158.

In S157, the laser control processor 130 adds 1 to the value of the counter i and returns to S153.

In S158, the laser control processor 130 determines whether or not to change the various parameters. For example, when parameters such as the shortest wavelength λS and the longest wavelength λL are newly received from the exposure control processor 210, it is determined to change the various parameters.

When the various parameters are to be changed (S158: YES), the laser control processor 130 ends processing of the present flowchart, and returns to processing shown in FIG. 11.

When the various parameters are not to be changed (S158: NO), the laser control processor 130 returns to S142 of FIG. 15. By repeating the processes from S142 to S158 of FIG. 16, the first pattern and the second pattern are alternately performed.

2.6 Specific Example of Wavelength Change

Figure 17A:
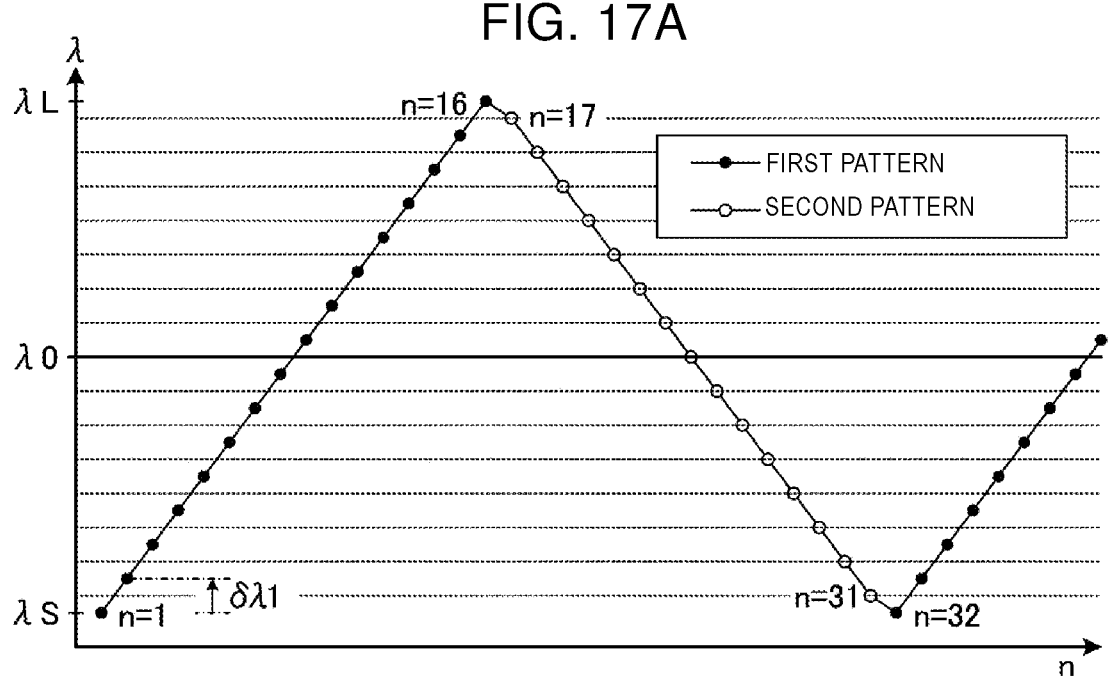
FIG. 17A is a graph showing the wavelength change set when the number of irradiation pulses N is an odd number in the first embodiment.

FIG. 17A is a graph showing the wavelength change set when the number of irradiation pulses N is an odd number in the first embodiment. In FIG. 17A, the horizontal axis represents the pulse number n and the vertical axis represents the wavelength λ.

The first pattern of the wavelength change includes 16 pulses from the 1st (n=1) to the 16th (n=16). The first pattern starts from the shortest wavelength λS, changes the wavelength by the wavelength change amount $\delta\lambda_1$ for each pulse, and finally reaches the longest wavelength λL.

The second pattern of the wavelength change includes 15 pulses from the 17th (n=17) to the 31st (n=31). The second pattern begins with a value obtained by subtracting half of $\delta\lambda_1$ from the longest wavelength λL, changes the wavelength by the wavelength change amount $-\delta\lambda_1$ for each pulse, and finally reaches a value obtained by adding a half of $\delta\lambda_1$ to the shortest wavelength λS.

By setting the first pattern and the second pattern in this way, since the wavelength change pattern becomes a periodic pattern for every 31 pulses, the moving average for every 31 pulses becomes constant regardless of how the continuous 31 pulses are selected.

Figure 17B:
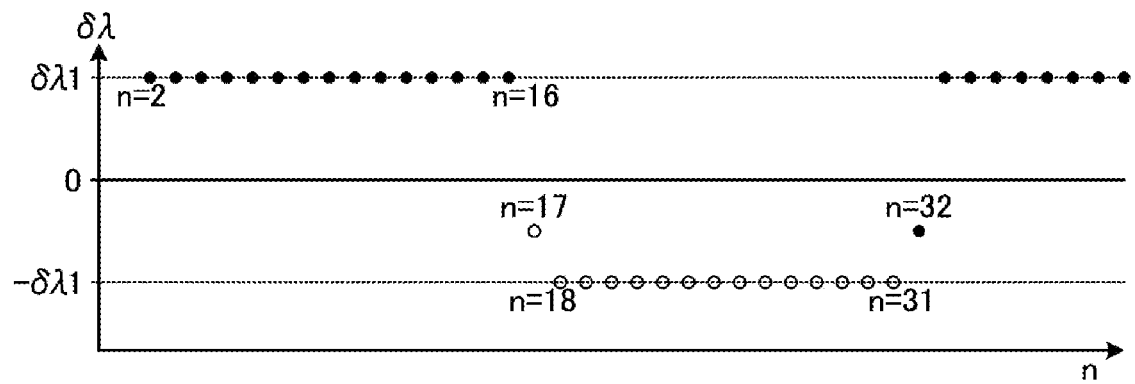
FIG. 17B is a graph showing transition of the wavelength change amount when the number of irradiation pulses N is an odd number in the first embodiment.

FIG. 17B is a graph showing transition of the wavelength change amount when the number of irradiation pulses N is an odd number in the first embodiment. In FIG. 17B, the horizontal axis represents the pulse number n and the vertical axis represents the wavelength change amount δλ.

The wavelength change amount δλ is constant at δλ$_1$ for 15 pulses from the 2nd (n=2) to the 16th (n=16). That is, the wavelength λ is increased by δλ$_1$ with respect to the previous pulse.

The wavelength change amount δλ is −δλ$_1$/2 for the 17th pulse (n=17).

The wavelength change amount δλ is constant at −δλ$_1$ for the 14 pulses from the 18th (n=18) to the 31st (n=31). That is, the wavelength λ changes by −δλ$_1$ with respect to the previous pulse, and the value of the wavelength λ is decreased.

The wavelength change amount δλ is −δλ$_1$/2 for the 32nd pulse (n=32).

When the number of irradiation pulses N is an odd number in the first embodiment, the wavelength λ repeatedly increases and decreases as described above.

Figure 17C:
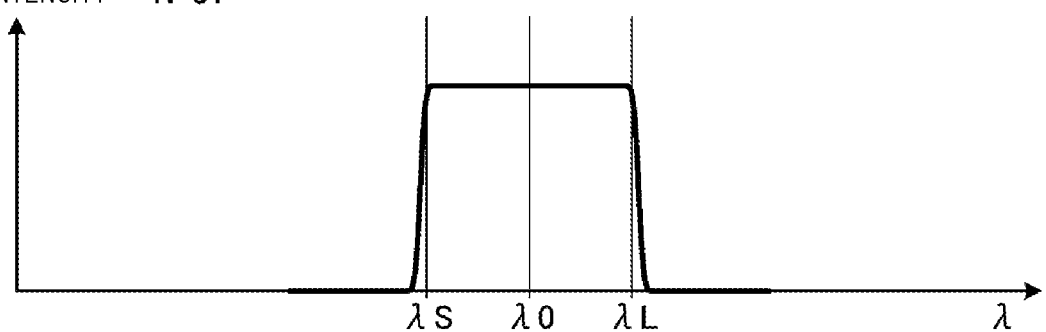
FIG. 17C is a graph showing the integrated spectrum of 31 pulses in the wavelength change shown in FIG. 17A.

FIG. 17C is a graph showing the integrated spectrum of 31 pulses in the wavelength change shown in FIG. 17A. In FIG. 17C, the horizontal axis represents the wavelength and the vertical axis represents the light intensity. In the wavelength change shown in FIG. 17A, since the wavelengths of the pulses included in the first pattern are shifted from those of the pulses included in the second pattern by δλ$_1$/2 each, a steep wavelength peak does not appear clearly in the integrated spectrum shown in FIG. 17C. If the light intensity of 31 pulses is maintained substantially constant, it is possible to make the integrated spectrum have a substantially flat top shape.

2.7 Effect

According to the first embodiment, the line narrowing gas laser device 100 includes the rotation stage 422 that changes the center wavelength λ of the pulse laser light and the laser control processor 130 that controls the rotation stage 422. The laser control processor 130 reads parameters including the number of irradiation pulses N, the shortest wavelength λS, and the longest wavelength λL of the pulse laser light with which one location of the irradiation receiving object is irradiated (S100). Further, the laser control processor 130 sets the first pattern with which the center wavelength is changed to approach the longest wavelength λL from the shortest wavelength λS and the second pattern with which the center wavelength is changed to approach the shortest wavelength λS from the longest wavelength λL such that at least one of the first pattern and the second pattern when the number of irradiation pulses N is an even number is different from corresponding one when the number of irradiation pulses N is an odd number (S110). Further, the laser control processor 130 controls the rotation stage 422 so that the first pattern and the second pattern are alternately performed (FIGS. 12, 13, 15, 16). For example, the wavelength change amount δλ$_1$ may be different between the case in which the number of irradiation pulses N is an even number and the case in which the number of irradiation pulses N is an odd number (S121, S141). Alternatively, the target wavelengths λt of the second pattern may be different between the case in which the number of irradiation pulses N is an even number and the case in which the number of irradiation pulses N is an odd number (S133, S153).

According to this, an appropriate wavelength change pattern can be set for each of the case in which the number of irradiation pulses N is an even number and the case in which the number of irradiation pulses N is an odd number. Since the moving average for each number of irradiation pulses N can be made constant regardless of how the continuous N pulses are selected, the average wavelength is prevented from being different depending on the irradiation position in the scan field SF, and the variation of the exposure result depending on the irradiation position is reduced.

According to the first embodiment, when the number of irradiation pulses N is an odd number, the laser control processor 130 sets one of the first pattern and the second pattern such that the wavelength change amount −δλ$_1$/2 from the previous pulse of one pulse (n=17 or n=32) is different from the wavelength change amount −δλ$_1$ or δλ$_1$ from the previous pulse of each of the other pulses (FIGS. 17A, 17B).

According to this, when the number of irradiation pulses N is an odd number, even if the number of pulses of the first pattern and the number of pulses of the second pattern are different from each other, a large number of pulses can be substantially equally distributed in the wavelength region between the shortest wavelength λS and the longest wavelength λL, and the integrated spectrum can have a substantially flat top shape.

According to the first embodiment, when the number of irradiation pulses N is an odd number, in either the first pattern or the second pattern, the wavelength change amount −δλ$_1$/2 from the previous pulse of the first pulse (n=17, n=32) is different from the wavelength change amount −δλ$_1$ or δλ$_1$ from the previous pulse of each of the other pulses (FIGS. 17A, 17B).

According to this, when the number of irradiation pulses N is an odd number, by shifting the wavelength change amount of the first pulse in either the first pattern or the second pattern, the integrated spectrum can have a substantially flat top shape.

According to the first embodiment, when the number of irradiation pulses N is an odd number, the number of pulses (N+1)/2 in the first pattern among the number of irradiation pulses N is set to be larger than the number of pulses (N−1)/2 in the second pattern (S146, S156). Then, the wavelength change amount −δλ$_1$/2 from the previous pulse of the first pulse (n=32) in the first pattern and the wavelength change amount −δλ$_1$/2 from the previous pulse of the first pulse (n=17) in the second pattern are half the wavelength change amount −δλ$_1$ from the previous pulse of each of the other pulses in the second pattern (FIGS. 17A, 17B).

According to this, when the number of irradiation pulses N is an odd number, by shifting half the wavelength change amount of the first pulse of each of the first pattern and the second pattern, the integrated spectrum can have a substantially flat top shape.

According to the first embodiment, when the number of irradiation pulses N is an odd number, the laser control processor 130 sets the number of pulses in the first pattern among the number of irradiation pulses N to (N+1)/2 (S146). Further, the wavelength change amount δλ$_1$ from the previous pulse of each of the second and subsequent pulses in the first pattern is set to (λL−λS)/((N−1)/2) (S141). The wavelength change amount from the previous pulse of the first pulse (n=32) in the first pattern is set to −δλ1/2 (FIGS. 17A, 17B). The wavelength change amount from the previous pulse of each of the second and subsequent pulses in the second pattern is set to −δλ$_1$ (FIGS. 17A, 17B). The wavelength change amount from the previous pulse of the first pulse (n=17) in the second pattern is set to −δλ$_1$/2 (FIGS. 17A, 17B).

According to this, when the number of irradiation pulses N is odd, by defining the wavelength change amounts of the first pattern and the second pattern, the integrated spectrum can have a substantially flat top shape.

According to the first embodiment, when the number of irradiation pulses N is an even number, the laser control processor 130 sets the number of pulses in the first pattern among the number of irradiation pulses N to N/2 (S126). Further, the wavelength change amount from the previous pulse of the first pulse (n=31) in the first pattern is set to 0 (FIGS. 14A, 14B). The wavelength change amount $\delta\lambda_1$ from the previous pulse of each of the second and subsequent pulses in the first pattern is set to $(\lambda L-\lambda S)/(N/2-1)$ (S121). The wavelength change amount from the previous pulse of the first pulse (n=16) in the second pattern is set to 0 (FIGS. 14A, 14B). The wavelength change amount from the previous pulse of each of the second and subsequent pulses in the second pattern is set to $-\delta\lambda_1$ (FIGS. 14A, 14B).

According to this, since the wavelength is changed in multiple steps between the shortest wavelength $\lambda S$ and the longest wavelength $\lambda L$, a large number of wavelength peaks appear in the integrated spectrum, and if the light intensity of each pulse is maintained substantially constant, the wavelength peaks have substantially the same light intensity and the integrated spectrum can have a substantially flat top shape. In other respects, the first embodiment is similar to the comparative example.

Figure 19:
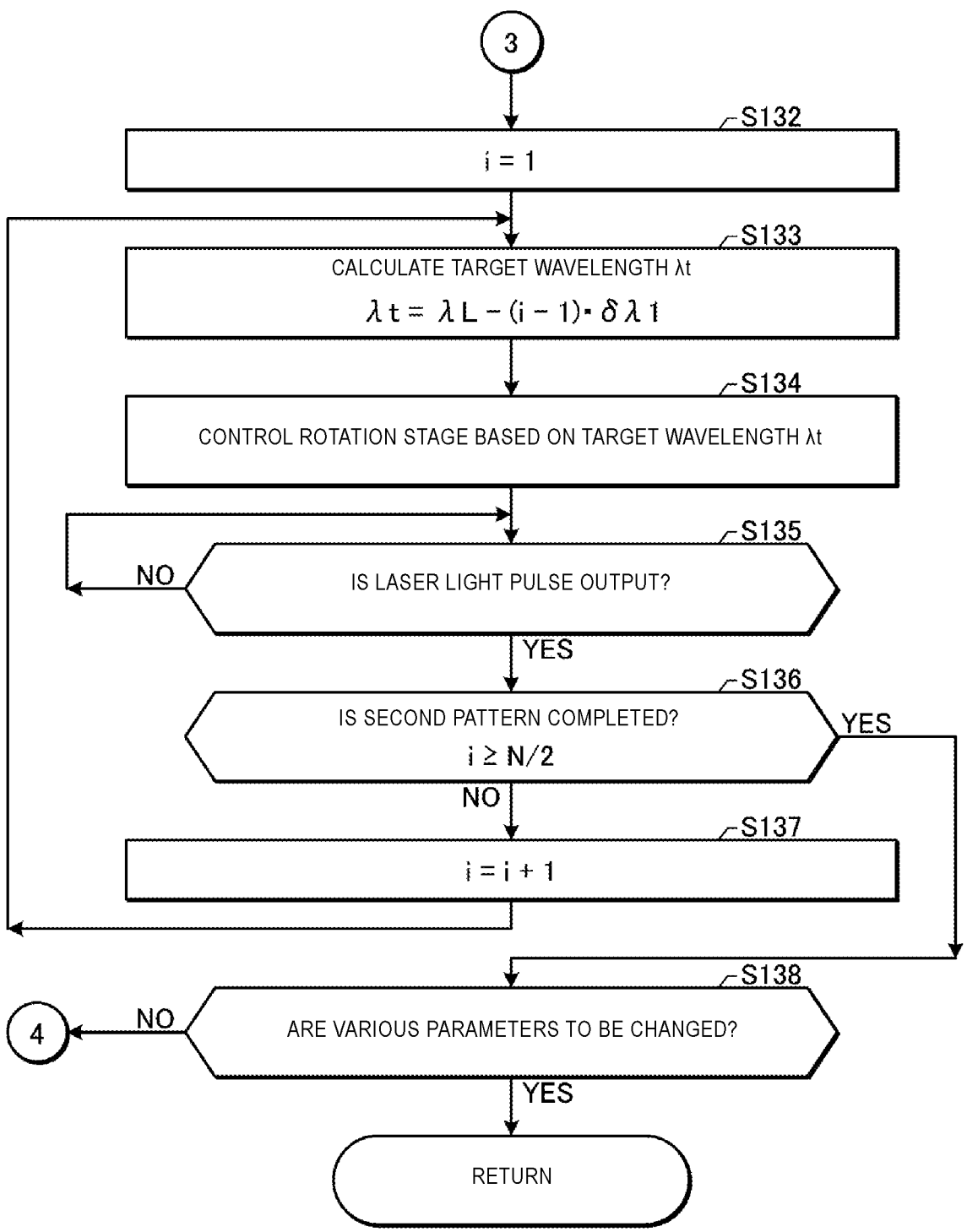
FIG. 19 is a flowchart showing a processing procedure of the wavelength control when the number of irradiation pulses N is an even number in the second embodiment.

3. MODIFICATION WHEN NUMBER OF IRRADIATION PULSES N IS EVEN NUMBER 3.1 Operation FIGS. 18 and 19 are flowcharts showing a processing procedure of the wavelength control when the number of irradiation pulses N is an even number in a second embodiment. The processing shown in FIGS. 18 and 19 corresponds to the subroutine of S120 in FIG. 11, and corresponds to a modification when the number of irradiation pulses N is an even number in the first embodiment.

The second embodiment is similar to the first embodiment in that the first pattern is performed with the first 15 pulses among 30 pulses and the second pattern is performed with the last 15 pulses.

First, in S121a, the laser control processor 130 calculates the wavelength change amount $\delta\lambda_1$ by the following equation.

$$\delta\lambda_1=(\lambda L-\lambda S)/(N/2)$$

When the number of irradiation pulses N is 30 (N=30), the wavelength change amount $\delta\lambda_1$ is a value obtained by dividing the difference between the longest wavelength $\lambda L$ and the shortest wavelength $\lambda S$ by 15.

In the subsequent processes from S122 to S127, the wavelength change is performed with the first pattern.

The processes of S122 to S127 are similar to the processes of S122 to S127 in FIG. 12, respectively.

In the processes from S132 to S137 of FIG. 19, the wavelength change is performed with the second pattern.

The processes from S132 to S137 and S138 are the same as the processes from S132 to S137 and S138 in FIG. 13, respectively.

3.2 Specific Example of Wavelength Change

Figure 20A:
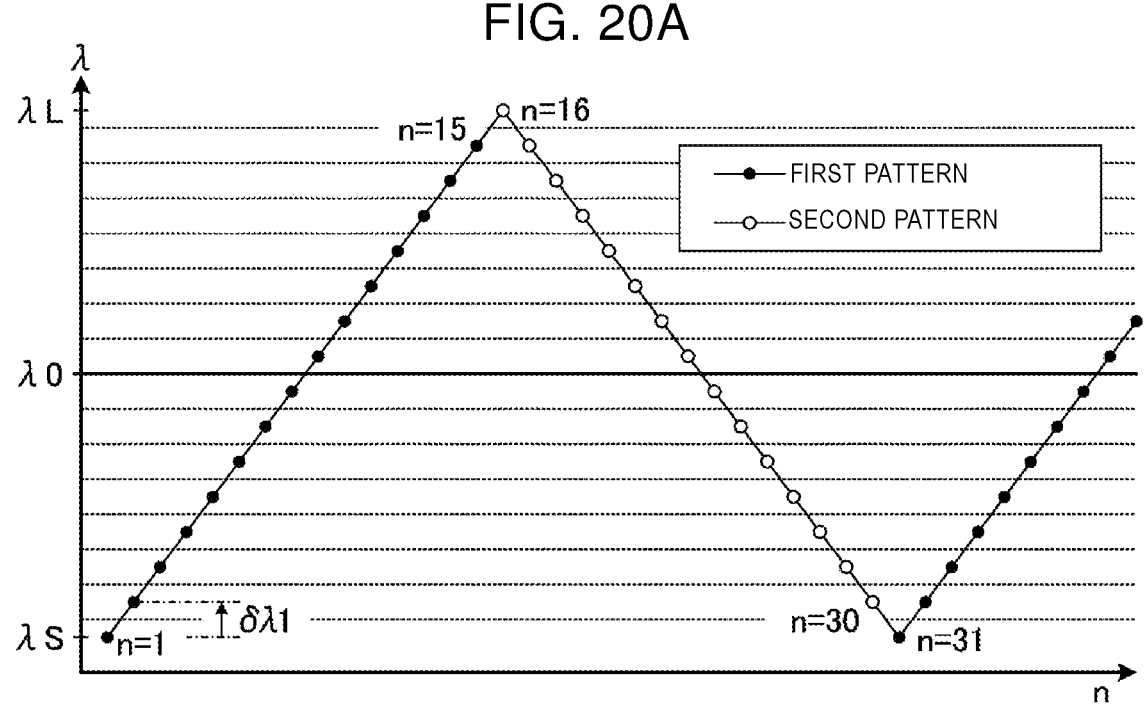
FIG. 20A is a graph showing the wavelength change set when the number of irradiation pulses N is an even number in the second embodiment.

FIG. 20A is a graph showing the wavelength change set when the number of irradiation pulses N is an even number in the second embodiment. In FIG. 20A, the horizontal axis represents the pulse number n and the vertical axis represents the wavelength $\lambda$.

The first pattern of the wavelength change includes 15 pulses from the 1st (n=1) to the 15th (n=15). The first pattern starts from the shortest wavelength $\lambda S$, and changes the wavelength by the wavelength change amount $\delta\lambda_1$ for each pulse. However, since the wavelength change amount $(\lambda L-\lambda S)/(N/2)$ in the second embodiment is slightly smaller than the wavelength change amount $(\lambda L-\lambda S)/(N/2-1)$ in the first embodiment, the 15th pulse (n=15) does not reach the longest wavelength $\lambda L$.

The second pattern of the wavelength change includes 15 pulses from the 16th (n=16) to the 30th (n=30). The second pattern starts from the longest wavelength $\lambda L$, and changes the wavelength by the wavelength change amount $-\delta\lambda_1$ for each pulse. However, the 30th pulse (n=30) does not reach the shortest wavelength $\lambda S$.

By setting the first pattern and the second pattern in this way, since the wavelength change pattern becomes a periodic pattern for every 30 pulses, the moving average for every 30 pulses becomes constant regardless of how the continuous 30 pulses are selected.

The wavelength difference between the wavelength of the 15th pulse (n=15) at the end of the first pattern and the longest wavelength $\lambda L$, which is the wavelength of the 16th pulse (n=16) at the start of the second pattern, is $\delta\lambda_1$. That is, the wavelength change amount of the 16th pulse (n=16) at the start of the second pattern is $\delta\lambda_1$.

The wavelength difference between the wavelength of the 30th pulse (n=30) at the end of the second pattern and the shortest wavelength $\lambda S$, which is the wavelength of the 31st pulse (n=31) at the start of the first pattern, is $-\delta\lambda_1$. That is, the wavelength change amount of the 31st pulse (n=31) at the start of the first pattern is $-\delta\lambda_1$.

Figure 20B:
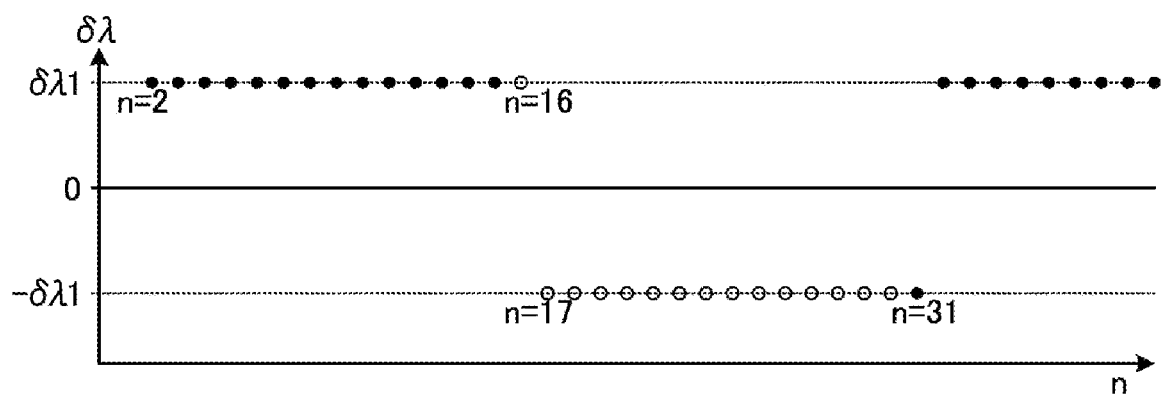
FIG. 20B is a graph showing transition of the wavelength change amount when the number of irradiation pulses N is an even number in the second embodiment.

FIG. 20B is a graph showing transition of the wavelength change amount when the number of irradiation pulses N is an even number in the second embodiment. In FIG. 20B, the horizontal axis represents the pulse number n and the vertical axis represents the wavelength change amount $\delta\lambda$.

The wavelength change amount $\delta\lambda$ is constant at $\delta\lambda_1$ for 15 pulses from the 2nd (n=2) to the 16th (n=16). That is, the wavelength $\lambda$ is increased by $\delta\lambda_1$ with respect to the previous pulse.

The wavelength change amount $\delta\lambda$ is constant at $-\delta\lambda_1$ for 15 pulses from the 17th (n=17) to the 31st (n=31). That is, the wavelength $\lambda$ changes by $-\delta\lambda_1$ with respect to the previous pulse, and the value of the wavelength $\lambda$ is decreased.

When the number of irradiation pulses N is an even number in the second embodiment, the wavelength $\lambda$ repeatedly increases and decreases as described above.

Figure 20C:
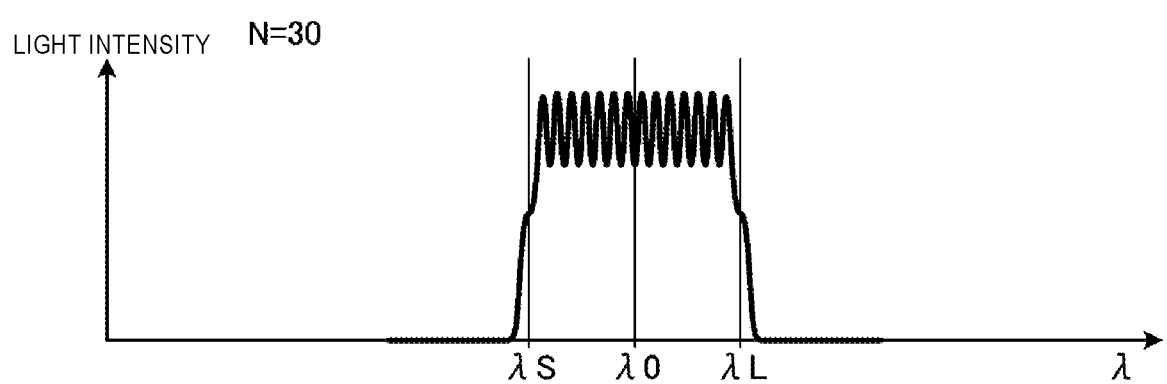
FIG. 20C is a graph showing the integrated spectrum of 30 pulses in the wavelength change shown in FIG. 20A.

FIG. 20C is a graph showing the integrated spectrum of 30 pulses in the wavelength change shown in FIG. 20A. In FIG. 20C, the horizontal axis represents the wavelength $\lambda$ and the vertical axis represents the light intensity. In the wavelength change shown in FIG. 20A, since the wavelength is changed in multiple steps between the shortest wavelength $\lambda S$ and the longest wavelength $\lambda L$, a large number of wavelength peaks appear between the shortest wavelength $\lambda S$ and the longest wavelength $\lambda L$ in the integrated spectrum shown in FIG. 20C. If the light intensity of 30 pulses is maintained substantially constant, a large number of wavelength peaks shown in FIG. 20C have substantially the same light intensity, and it is possible to make the integrated spectrum have a substantially flat top shape. However, since a pulse is generated only once at each of the longest wavelength $\lambda L$ and the shortest wavelength $\lambda S$, the light intensity at each of the longest wavelength $\lambda L$ and the shortest wavelength $\lambda S$ is about half the peak intensity at each of the other wavelengths.

3.3 Effect

According to the second embodiment, when the number of irradiation pulses N is an even number, the laser control processor 130 sets the number of pulses in the first pattern among the number of irradiation pulses N to N/2 (S126). Further, the wavelength change amount $\delta\lambda_1$ from the previous pulse of each of the pulses in the first pattern is set to $(\lambda L-\lambda S)/(N/2)$ (S121a). The wavelength change amount from the previous pulse of each of the pulses in the second pattern is set to $-\delta\lambda_1$ (FIGS. 20A, 20B).

According to this, since the wavelength is changed in multiple steps between the shortest wavelength $\lambda S$ and the longest wavelength $\lambda L$, a large number of wavelength peaks appear in the integrated spectrum, and if the light intensity of each pulse is maintained substantially constant, the wavelength peaks have substantially the same light intensity and the integrated spectrum can have a substantially flat top shape.

In other respects, the second embodiment is similar to the first embodiment.

Figure 22:
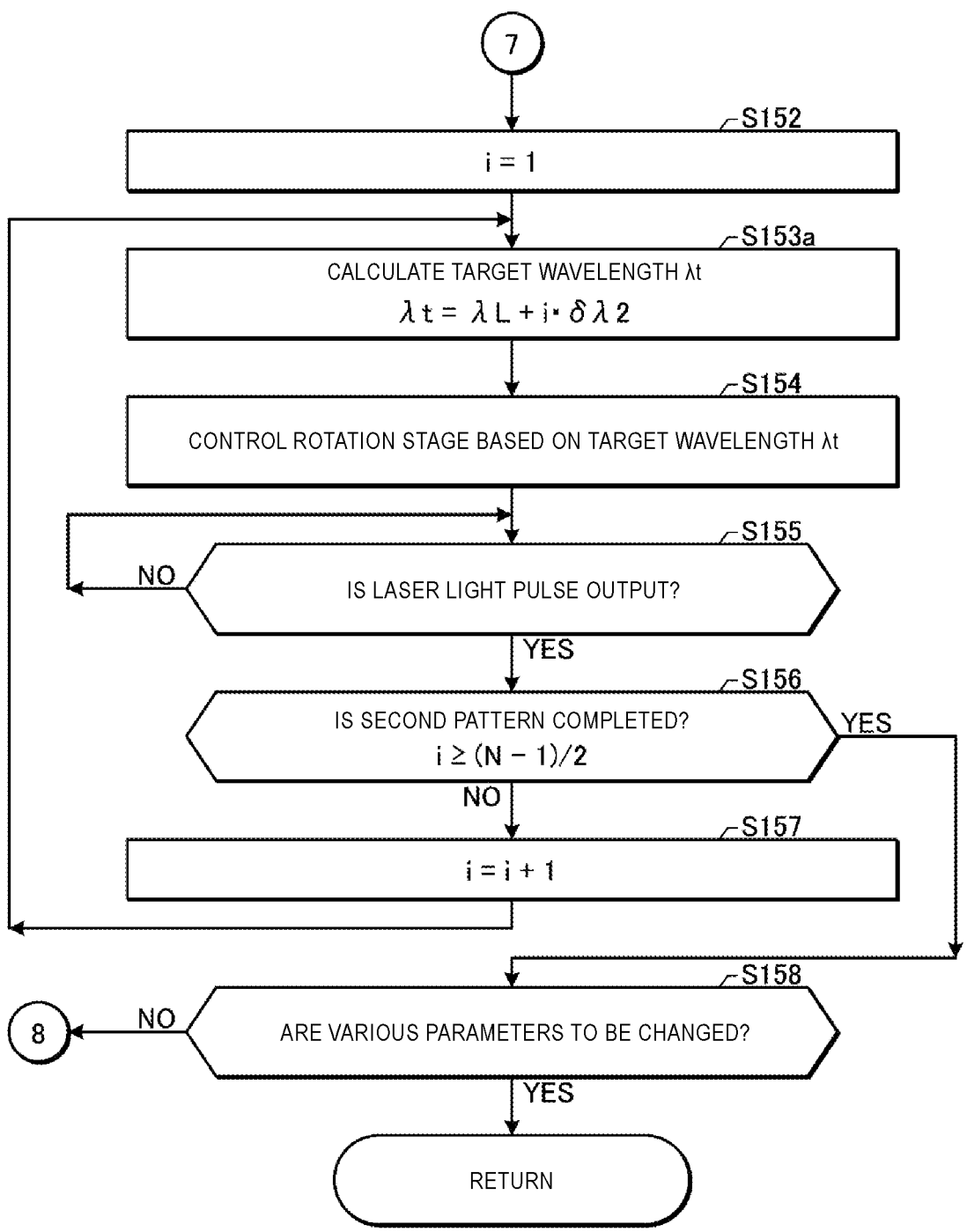
FIG. 22 is a flowchart showing a processing procedure of the wavelength control when the number of irradiation pulses N is an odd number in the third embodiment.

4. MODIFICATION WHEN NUMBER OF IRRADIATION PULSES N IS ODD NUMBER 4.1 Operation FIGS. 21 and 22 are flowcharts showing a processing procedure of the wavelength control when the number of irradiation pulses N is an odd number in a third embodiment. The processing shown in FIGS. 21 and 22 corresponds to the subroutine of S140 in FIG. 11, and corresponds to a modification when the number of irradiation pulses N is an odd number in the first embodiment.

The third embodiment is similar to the first embodiment in that the first pattern is performed with the first 16 pulses among 31 pulses and the second pattern is performed with the last 15 pulses.

First, in S141a, the laser control processor 130 calculates wavelength change amounts $\delta\lambda_1$, $\delta\lambda_2$ by the following equation.

$$\delta\lambda_1=(\lambda L-\lambda S)/((N-1)/2)$$

$$\delta\lambda_2=-(\lambda L-\lambda S)/((N+1)/2)$$

The wavelength change amount $\delta\lambda_1$ is a wavelength change amount for the first pattern. When the number of irradiation pulses N is 31 (N=31), the wavelength change amount $\delta\lambda_1$ is a value obtained by dividing the difference between the longest wavelength $\lambda L$ and the shortest wavelength $\lambda S$ by 15.

The wavelength change amount $\delta\lambda_2$ is a wavelength change amount for the second pattern. When the number of irradiation pulses N is 31 (N=31), the wavelength change amount $\delta\lambda_2$ is a value obtained by multiplying $-1$ by a value obtained by dividing the difference between the longest wavelength $\lambda L$ and the shortest wavelength $\lambda S$ by 16.

In the subsequent processes from S142 to S147, the wavelength change is performed with the first pattern.

The processes of S142 to S147 are similar to the processes of S142 to S147 in FIG. 15, respectively.

In the processes from S152 to S157 of FIG. 22, the wavelength change is performed with the second pattern.

In S152, the laser control processor 130 sets the counter i for counting the number of pulses to 1 again.

Next, in S153a, the laser control processor 130 calculates the target wavelength $\lambda t$ by the following equation.

$$\lambda t=\lambda L+i\cdot\delta\lambda_2$$

When the value of the counter i is 1 (i=1), the target wavelength $\lambda t$ is at a value obtained by adding $\delta\lambda_2$ to the longest wavelength $\lambda L$.

As the value of the counter i is increased by 1, the target wavelength $\lambda t$ is added with the wavelength change amount $\delta\lambda_2$ for each pulse, and the value of the target wavelength $\lambda t$ is decreased.

The subsequent processes from S154 to S158 are similar to the processes from S154 to S158 in FIG. 16, respectively.

4.2 Specific Example of Wavelength Change

Figure 23A:
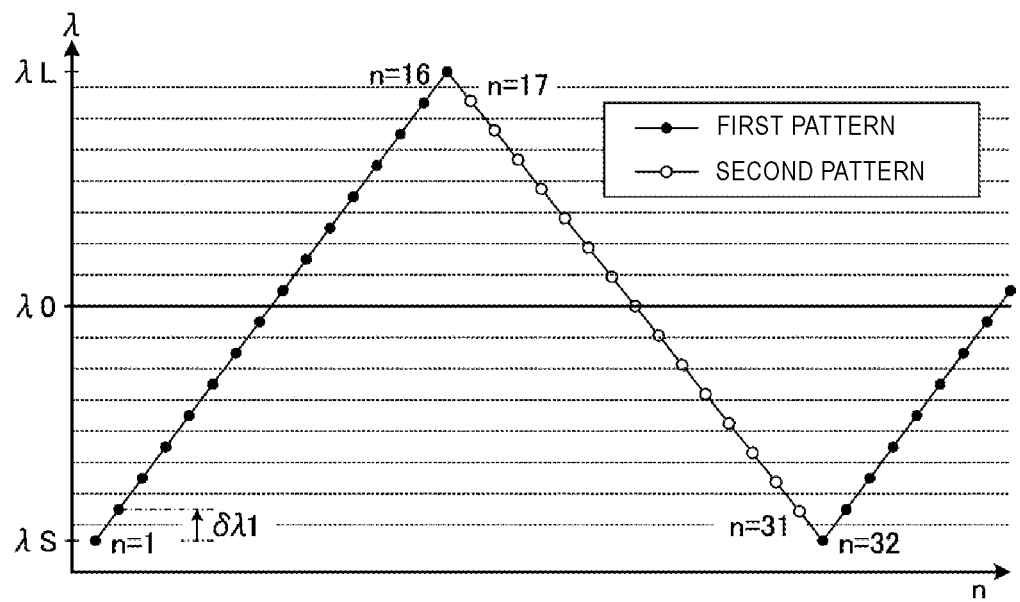
FIG. 23A is a graph showing the wavelength change set when the number of irradiation pulses N is an odd number in the third embodiment.

FIG. 23A is a graph showing the wavelength change set when the number of irradiation pulses N is an odd number in the third embodiment. In FIG. 23A, the horizontal axis represents the pulse number n and the vertical axis represents the wavelength $\lambda$.

The first pattern of the wavelength change includes 16 pulses from the 1st (n=1) to the 16th (n=16). The first pattern starts from the shortest wavelength $\lambda S$, changes the wavelength by the wavelength change amount $\delta\lambda_1$ for each pulse, and finally reaches the longest wavelength $\lambda L$.

The second pattern of the wavelength change includes 15 pulses from the 17th (n=17) to the 31st (n=31). The second pattern starts from the value obtained by adding $\delta\lambda_2$ to the longest wavelength $\lambda L$, changes the wavelength by the wavelength change amount $\delta\lambda_2$ for each pulse, and finally, reaches the value larger than the shortest wavelength $\lambda S$ by $-\delta\lambda_2$.

By setting the first pattern and the second pattern in this way, since the wavelength change pattern becomes a periodic pattern for every 31 pulses, the moving average for every 31 pulses becomes constant regardless of how the continuous 31 pulses are selected.

The wavelength difference between the longest wavelength $\lambda L$, which is the wavelength of the 16th pulse (n=16) at the end of the first pattern, and the wavelength of the 17th pulse (n=17) at the start of the second pattern is $\delta\lambda_2$. That is, the wavelength change amount of the 17th pulse (n=17) at the start of the second pattern is $\delta\lambda_2$.

The wavelength change amount $\delta\lambda_2$ has an absolute value slightly smaller than that of the wavelength change amount $\delta\lambda_1$. The wavelength difference between the wavelength of the 31st pulse (n=31) at the end of the second pattern and the shortest wavelength $\lambda S$, which is the wavelength of the 32nd pulse (n=32) at the start of the first pattern, is $\delta\lambda_2$. That is, the wavelength change amount of the pulse at the start of the first pattern is $\delta\lambda_2$.

Figure 23B:
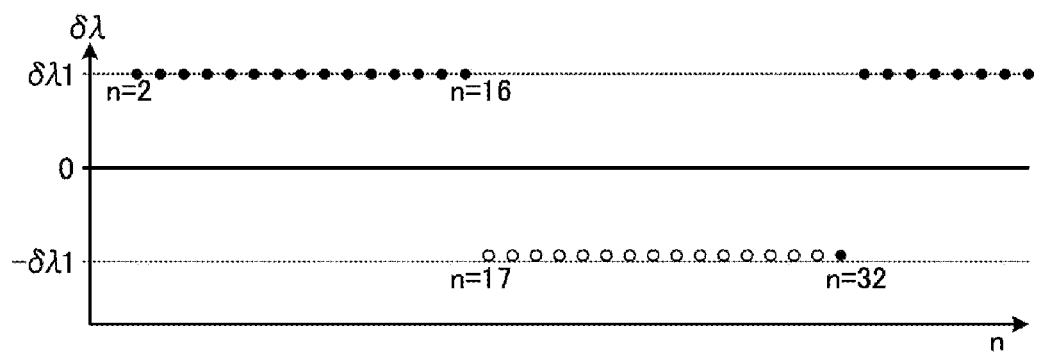
FIG. 23B is a graph showing transition of the wavelength change amount when the number of irradiation pulses N is an odd number in the third embodiment.

FIG. 23B is a graph showing transition of the wavelength change amount when the number of irradiation pulses N is an odd number in the third embodiment. In FIG. 23B, the horizontal axis represents the pulse number n and the vertical axis represents the wavelength change amount $\delta\lambda$.

The wavelength change amount $\delta\lambda$ is constant at $\delta\lambda_1$ for 15 pulses from the 2nd (n=2) to the 16th (n=16). That is, the wavelength $\lambda$ is increased by $\delta\lambda_1$ with respect to the previous pulse.

The wavelength change amount $\delta\lambda$ is constant at $\delta\lambda_2$ for the 16 pulses from the 17th (n=17) to the 32nd (n=32). That is, the wavelength $\lambda$ is decreased as $\delta\lambda_2$ is added to the previous pulse.

When the number of irradiation pulses N is an odd number in the third embodiment, the wavelength $\lambda$ repeatedly increases and decreases as described above.

Figure 23C:
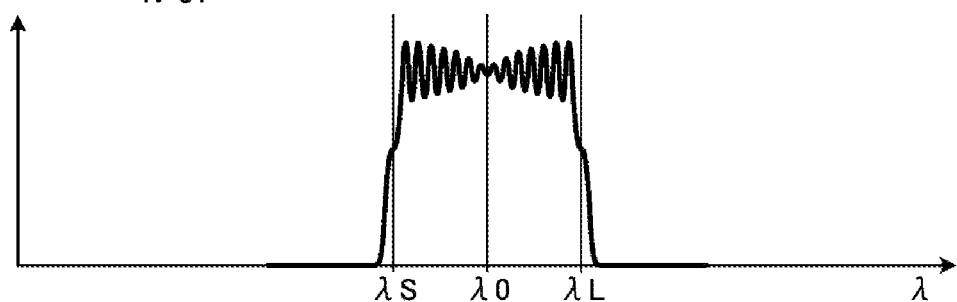
FIG. 23C is a graph showing the integrated spectrum of 31 pulses in the wavelength change shown in FIG. 23A.

FIG. 23C is a graph showing the integrated spectrum of 31 pulses in the wavelength change shown in FIG. 23A. In FIG. 23C, the horizontal axis represents the wavelength $\lambda$ and the vertical axis represents the light intensity. In the wavelength change shown in FIG. 23A, since the wavelength is changed in multiple steps between the shortest wavelength $\lambda S$ and the longest wavelength $\lambda L$, a large number of wavelength peaks appear between the shortest wavelength λS and the longest wavelength λL in the integrated spectrum shown in FIG. 23C. A plurality of steep peaks appear in the wavelength regions close to the shortest wavelength λS and the longest wavelength λL at both ends of the spectrum. In contrast, in the vicinity of the average wavelength λ0, since the wavelength is shifted by $\delta\lambda_1/2$ between the first pattern and the second pattern, a steep wavelength peak does not clearly appear. If the light intensity of 31 pulses is maintained substantially constant, a large number of wavelength peaks shown in FIG. 23C have substantially the same light intensity, and it is possible to make the integrated spectrum have a substantially flat top shape. However, since a pulse is generated only once at each of the longest wavelength λL and the shortest wavelength λS, the light intensity at each of the longest wavelength λL and the shortest wavelength λS is about half the peak intensity at each of the other wavelengths.

4.3 Effect

According to the third embodiment, when the number of irradiation pulses N is an odd number, the laser control processor 130 sets the first pattern and the second pattern such that the absolute value of the wavelength change amount $\delta\lambda_1$ from the previous pulse of each of the pulses in the first pattern is different from the absolute value of the wavelength change amount $\delta\lambda_2$ from the previous pulse of each of the pulses in the second pattern (S141a).

According to this, when the number of irradiation pulses N is an odd number, even if the number of pulses of the first pattern and the number of pulses of the second pattern are different from each other, a large number of pulses can be substantially equally distributed in the wavelength region between the shortest wavelength λS and the longest wavelength λL, and the integrated spectrum can have a substantially flat top shape.

According to the third embodiment, when the number of irradiation pulses N is an odd number, the ratio between the absolute value of the wavelength change amount $\delta\lambda_1$ from the previous pulse of each of the pulses in the first pattern and the absolute value of the wavelength change amount $\delta\lambda_2$ from the previous pulse of each of the pulses in the second pattern is equal to the ratio between the number of pulses (N−1)/2 in the second pattern among the number of irradiation pulses N and the number of pulses (N+1)/2 in the first pattern (S141a, S146, S156).

According to this, when the number of irradiation pulses N is an odd number, in accordance with the ratio between the number of pulses of the first pattern and the number of pulses of the second pattern, a large number of pulses can be substantially equally distributed in the wavelength region between the shortest wavelength λS and the longest wavelength λL, and the integrated spectrum can have a substantially flat top shape.

According to the third embodiment, when the number of irradiation pulses N is an odd number, the laser control processor 130 sets the number of pulses in the first pattern among the number of irradiation pulses N to (N+1)/2 (S146). Further, the wavelength change amount $\delta\lambda_1$ from the previous pulse of each of the pulses in the first pattern is set to (λL−λS)/((N−1)/2), and the wavelength change amount $\delta\lambda_2$ from the previous pulse of each of the pulses in the second pattern is set to −(λL−λS)/((N+1)/2) (S141a).

According to this, when the number of irradiation pulses N is an odd number, even if the number of pulses of the first pattern and the number of pulses of the second pattern are different from each other, the integrated spectrum can have a substantially flat top shape.

In other respects, the third embodiment is similar to the first embodiment. Alternatively, application of the second embodiment when the number of irradiation pulses N is an even number and application of the third embodiment when the number of irradiation pulses N is an odd number may be combined.

5. OTHERS

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious to those skilled in the art that embodiments of the present disclosure would be appropriately combined.

The terms used throughout the present specification and the appended claims should be interpreted as non-limiting terms unless clearly described. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. A line narrowing gas laser device, comprising:
   an actuator configured to change a center wavelength of pulse laser light; and
   a processor configured to control the actuator,
   the processor reading parameters including a number of irradiation pulses of pulse laser light to be radiated to one location of an irradiation receiving object, a shortest wavelength, and a longest wavelength;
   setting a first pattern with which the center wavelength is changed to approach the longest wavelength from the shortest wavelength and a second pattern with which the center wavelength is changed to approach the shortest wavelength from the longest wavelength such that at least one of the first pattern and the second pattern is different between a case in which the number of irradiation pulses is an even number and a case in which the number of irradiation pulses is an odd number; and
   controlling the actuator so that the first pattern and the second pattern are alternately performed.

2. The line narrowing gas laser device according to claim 1,
   wherein the processor sets one of the first pattern and the second pattern such that, when the number of irradiation pulses is an odd number, a wavelength change amount from a previous pulse of one pulse is different from a wavelength change amount from a previous pulse of each of the other pulses in either the first pattern or the second pattern.

3. The line narrowing gas laser device according to claim 2,
   wherein a wavelength change amount from a previous pulse of a first pulse is different from a wavelength change amount from a previous pulse of each of other pulses in either the first pattern or the second pattern.

4. The line narrowing gas laser device according to claim 2,
wherein a number of pulses in the first pattern among the number of irradiation pulses is larger than a number of pulses in the second pattern among the number of irradiation pulses, and
the wavelength change amount from a previous pulse of a first pulse in the first pattern and the wavelength change amount from a previous pulse of a first pulse in the second pattern are half the wavelength change amount from a previous pulse of each of other pulses in the second pattern.

5. The line narrowing gas laser device according to claim 2,
wherein, where the shortest wavelength is $\lambda S$ and the longest wavelength is $\lambda L$, the processor:
sets a number of pulses in the first pattern among the number of irradiation pulses N to $(N+1)/2$;
sets the wavelength change amount $\delta\lambda_1$ from a previous pulse of each second and subsequent pulses in the first pattern to $(\lambda L-\lambda S)/((N-1)/2)$;
sets the wavelength change amount from a previous pulse of a first pulse in the first pattern to $-\delta\lambda_1/2$;
sets the wavelength change amount from a previous pulse of each second and subsequent pulses in the second pattern to $-\delta\lambda_1$; and
sets the wavelength change amount from a previous pulse of a first pulse in the second pattern to $-\delta\lambda_1/2$.

6. The line narrowing gas laser device according to claim 1,
wherein, when the number of irradiation pulses is an odd number, the processor sets the first pattern and the second pattern such that an absolute value of a wavelength change amount from a previous pulse of each of pulses in the first pattern is different from an absolute value of a wavelength change amount from a previous pulse of each of pulses in the second pattern.

7. The line narrowing gas laser device according to claim 6,
wherein a ratio between the absolute value of the wavelength change amount from the previous pulse of each of the pulses in the first pattern and the absolute value of the wavelength change amount from the previous pulse of each of the pulses in the second pattern is equal to a ratio between a number of pulses in the second pattern among the number of irradiation pulses and a number of pulses in the first pattern among the number of irradiation pulses.

8. The line narrowing gas laser device according to claim 6,
wherein, where the shortest wavelength is $\lambda S$ and the longest wavelength is $\lambda L$, the processor:
sets a number of pulses in the first pattern among the number of irradiation pulses N to $(N+1)/2$;
sets the wavelength change amount from a previous pulse of each of pulses in the first pattern to $(\lambda L-\lambda S)/((N-1)/2)$; and
sets the wavelength change amount from a previous pulse of each of pulses in the second pattern to $-(\lambda L-\lambda S)/((N+1)/2)$.

9. The line narrowing gas laser device according to claim 1,
wherein, where the shortest wavelength is $\lambda S$ and the longest wavelength is $\lambda L$ and when the number of irradiation pulses is an even number, the processor:
sets a number of pulses in the first pattern among the number of irradiation pulses N to $N/2$;
sets a wavelength change amount from a previous pulse of a first pulse in the first pattern to 0;
sets a wavelength change amount $\delta\lambda_1$ from a previous pulse of each of second and subsequent pulses in the first pattern to $(\lambda L-\lambda S)/(N/2-1)$;
sets a wavelength change amount from a previous pulse of a first pulse in the second pattern to 0; and
sets a wavelength change amount from a previous pulse of each of second and subsequent pulses in the second pattern to $-\delta\lambda_1$.

10. The line narrowing gas laser device according to claim 1,
wherein, where the shortest wavelength is $\lambda S$ and the longest wavelength is $\lambda L$ and when the number of irradiation pulses is an even number, the processor:
sets a number of pulses in the first pattern among the number of irradiation pulses N to $N/2$;
sets a wavelength change amount $\delta\lambda_1$ from a previous pulse of each of pulses in the first pattern to $(\lambda L-\lambda S)/(N/2)$; and
sets a wavelength change amount from a previous pulse of each of pulses in the second pattern to $-\delta\lambda_1$.

11. A wavelength control method for controlling a center wavelength of pulse laser light output from a line narrowing gas laser device, comprising:
reading parameters including a number of irradiation pulses of pulse laser light to be radiated to one location of an irradiation receiving object, a shortest wavelength, and a longest wavelength;
setting a first pattern with which the center wavelength is changed to approach the longest wavelength from the shortest wavelength and a second pattern with which the center wavelength is changed to approach the shortest wavelength from the longest wavelength such that at least one of the first pattern and the second pattern is different between a case in which the number of irradiation pulses is an even number and a case in which the number of irradiation pulses is an odd number; and
controlling an actuator that changes the center wavelength so that the first pattern and the second pattern are alternately performed.

12. The wavelength control method according to claim 11,
wherein one of the first pattern and the second pattern is set such that, when the number of irradiation pulses is an odd number, a wavelength change amount from a previous pulse of one pulse is different from a wavelength change amount from a previous pulse of each of the other pulses in either the first pattern or the second pattern.

13. The wavelength control method according to claim 12,
wherein a wavelength change amount from a previous pulse of a first pulse is different from a wavelength change amount from a previous pulse of each of other pulses in either the first pattern or the second pattern.

14. The wavelength control method according to claim 12,
wherein a number of pulses in the first pattern among the number of irradiation pulses is larger than a number of pulses in the second pattern among the number of irradiation pulses, and
the wavelength change amount from a previous pulse of a first pulse in the first pattern and the wavelength change amount from a previous pulse of a first pulse in the second pattern are half the wavelength change amount from a previous pulse of each of other pulses in the second pattern.

15. The wavelength control method according to claim 12,
wherein, where the shortest wavelength is λS and the longest wavelength is λL,
a number of pulses in the first pattern among the number of irradiation pulses N is set to (N+1)/2;
the wavelength change amount δλ$_1$ from a previous pulse of each second and subsequent pulses in the first pattern is set to (λL−λS)/((N−1)/2);
the wavelength change amount from a previous pulse of a first pulse in the first pattern is set to −δλ$_1$/2;
the wavelength change amount from a previous pulse of each second and subsequent pulses in the second pattern is set to −δλ$_1$; and
the wavelength change amount from a previous pulse of a first pulse in the second pattern is set to −δλ$_1$/2.

16. The wavelength control method according to claim 11,
wherein the first pattern and the second pattern are set such that, when the number of irradiation pulses is an odd number, an absolute value of a wavelength change amount from a previous pulse of each of pulses in the first pattern is different from an absolute value of a wavelength change amount from a previous pulse of each of pulses in the second pattern.

17. The wavelength control method according to claim 16,
wherein a ratio between the absolute value of the wavelength change amount from the previous pulse of each of the pulses in the first pattern and the absolute value of the wavelength change amount from the previous pulse of each of the pulses in the second pattern is equal to a ratio between a number of pulses in the second pattern among the number of irradiation pulses and a number of pulses in the first pattern among the number of irradiation pulses.

18. The wavelength control method according to claim 16,
wherein, where the shortest wavelength is λS and the longest wavelength is λL,
a number of pulses in the first pattern among the number of irradiation pulses N is set to (N+1)/2;
the wavelength change amount from a previous pulse of each of pulses in the first pattern is set to (λL−λS)/((N−1)/2); and
the wavelength change amount from a previous pulse of each of pulses in the second pattern is set to −(λL−λS)/((N+1)/2).

19. The wavelength control method according to claim 11,
wherein, where the shortest wavelength is λS and the longest wavelength is λL and when the number of irradiation pulses is an even number,
a number of pulses in the first pattern among the number of irradiation pulses N is set to N/2;
a wavelength change amount from a previous pulse of a first pulse in the first pattern is set to 0;
a wavelength change amount δλ$_1$ from a previous pulse of each of second and subsequent pulses in the first pattern is set to (λL−λS)/(N/2−1);
a wavelength change amount from a previous pulse of a first pulse in the second pattern is set to 0; and
a wavelength change amount from a previous pulse of each of second and subsequent pulses in the second pattern is set to −δλ$_1$.

20. An electronic device manufacturing method, comprising:
generating pulse laser light using a line narrowing gas laser device;
outputting the pulse laser light to an exposure apparatus; and
exposing a photosensitive substrate to the pulse laser light in the exposure apparatus to manufacture an electronic device,
the line narrowing gas laser device including:
an actuator configured to change a center wavelength of the pulse laser light; and
a processor configured to control the actuator, and
the processor reading parameters including a number of irradiation pulses of the pulse laser light to be radiated to one location of an irradiation receiving object, a shortest wavelength, and a longest wavelength;
setting a first pattern with which the center wavelength is changed to approach the longest wavelength from the shortest wavelength and a second pattern with which the center wavelength is changed to approach the shortest wavelength from the longest wavelength such that at least one of the first pattern and the second pattern is different between a case in which the number of irradiation pulses is an even number and a case in which the number of irradiation pulses is an odd number; and
controlling the actuator so that the first pattern and the second pattern are alternately performed.

* * * * *